(12) United States Patent
Hens et al.

(10) Patent No.: US 9,610,612 B2
(45) Date of Patent: Apr. 4, 2017

(54) SYNTHESIS OF NANOMATERIALS

(71) Applicant: UNIVERSITEIT GENT, Ghent (BE)

(72) Inventors: Zeger Hens, Ghent (BE); Stijn Flamee, Ghent (BE)

(73) Assignee: UNIVERSITEIT GENT, Ghent (BE)

( * ) Notice: Subject to any disclaimer, the term of this patent is extended or adjusted under 35 U.S.C. 154(b) by 89 days.

(21) Appl. No.: 14/357,428

(22) PCT Filed: Nov. 12, 2012

(86) PCT No.: PCT/EP2012/072428
§ 371 (c)(1),
(2) Date: May 9, 2014

(87) PCT Pub. No.: WO2013/068601
PCT Pub. Date: May 16, 2013

(65) Prior Publication Data
US 2014/0255604 A1    Sep. 11, 2014

(30) Foreign Application Priority Data
Nov. 10, 2011   (EP) .................................. 11188714

(51) Int. Cl.
*B05D 7/24* (2006.01)
*C01B 19/00* (2006.01)
*B82Y 30/00* (2011.01)

(52) U.S. Cl.
CPC .............. *B05D 7/24* (2013.01); *B82Y 30/00* (2013.01); *C01B 19/002* (2013.01); *C01B 19/007* (2013.01); *C01P 2002/72* (2013.01); *C01P 2002/84* (2013.01); *C01P 2002/86* (2013.01); *C01P 2004/04* (2013.01); *C01P 2004/52* (2013.01); *C01P 2004/64* (2013.01); *C01P 2004/80* (2013.01)

(58) Field of Classification Search
CPC ......... B05D 7/24; B82Y 30/00; C01B 19/002; C01B 19/007; C01P 2002/72; C01P 2002/84; C01P 2002/86; C01P 2004/04; C01P 2004/52; C01P 2004/64; C01P 2004/80
USPC ........ 427/213.32, 215; 117/68; 438/93, 478, 438/104; 428/404, 403, 402, 478; 257/66, 104
See application file for complete search history.

(56) References Cited

U.S. PATENT DOCUMENTS

2003/0097976 A1* 5/2003 Zehnder ................. B82Y 30/00
                                                                  117/68
2006/0019427 A1    1/2006 Cao
2011/0260111 A1   10/2011 Nie et al.

FOREIGN PATENT DOCUMENTS

CN         101913574 A     12/2010
WO         2010028112 A2    3/2010

OTHER PUBLICATIONS

Yu et al., Angew. Cem. Int. Ed. 2002, 41, No. 13, p. 2368-2371.*
European Search Report for corresponding European Application No. 11188714.7, Jun. 13, 2012.
International Search Report for corresponding International PCT Application No. PCT/EP2012/072428, May 2, 2013.
Jasieniak et al., "Phosphine-Free Synthesis of CdSe Nanocrystals," The Journal of Physical Chemistry B Letters, Sep. 20, 2005, pp. 20665-20668, vol. 109 (44).
Peng et al., "Formation of High-Quality CdTe, CdSe, and CdS Nanocrystals Using CdO as Precursor," Journal of the American Chemical Society, Jan. 1, 2001, pp. 183-184, vol. 123, No. 1.
Yang et al., "Synthesis of CdSe and CdTe Nanocrystals without Precursor Injection," Angewandte Chemie, 2005, pp. 6870-6873, vol. 117.

* cited by examiner

*Primary Examiner* — Irina S Zemel
(74) *Attorney, Agent, or Firm* — Workman Nydegger

(57) ABSTRACT

A method is disclosed for synthesis of nanoparticles of metal selenide, metal selenide alloys, metal chalcogenide comprising at least selenium or metal chalcogenide alloys comprising at least selenium. The method comprises obtaining a heterogeneous dispersion of powder at least selenium in a first solvent at a first temperature, the first temperature being such that the heterogeneous dispersion comprises at least a fraction of undissolved powder in the solvent. The method also comprises introducing the heterogeneous dispersion into a second solvent containing a metal cation precursor, the second solvent being at a second temperature higher than said first temperature allowing, upon introduction of the heterogeneous dispersion, dissolution of at least the fraction of the power resulting in nucleation of the nanoparticles. The method results in efficient and easy production of nanoparticles.

12 Claims, 16 Drawing Sheets

SYNTHESIS OF NANOMATERIALS

FIELD OF THE INVENTION

The invention relates to the field of nanoparticles. More specifically, the present invention relates to methods and systems for synthesis of nanoparticles.

BACKGROUND OF THE INVENTION

There is an emerging market for dispersed nanoparticles in various fields of the opto-electronic industry. Some typical applications of for example metal selenide nanocrystals are solid state lighting, printed photovoltaics, photodetectors, biolabeling etc.

Over the last 20 year, various solution-based routes for the formation of metal selenide nanocrystals have been developed. One technique that can be used is a heating up technique, wherein the components are initially mixed and wherein thereafter heating of the mixture is performed. An example thereof is described in "Synthesis of CdSe and CdTe Nanocrystals without precursor injection" by Yang et al. in Angew. Chem. 2005, volume 117, p 6870-6873. Another technique that is often used is the hot injection method. The hot injection method in which metal and selenium precursors are injected in a hot solvent to form metal selenide nanoparticles showed to offer most control over size and shape. It has resulted in synthesis recipes for nanocrystals of, e.g., CdSe and PbSe with size dispersions as low as 5% and accessible size ranges from 2 to more than 20 nm. With respect to upscaling, the hot injection synthesis faces a number of issues.

Most current approaches use precursors that are oxygen or water sensitive, such as trioctylphosphine selenium or bistrimethylsilylselenide. The latter implies that, for the current synthesis methods, there is a need for a controlled inert atmosphere, such as for example a nitrogen or argon atmosphere.

Another problem that typically occurs when using hot injection is that the reactions are often very slow to run to completion. Attempts to adjust the yield of a hot injection synthesis have been limited. In general, attaining a high synthesis yield in a reasonable time span requires highly reactive precursors or reaction intermediates. The yield therefore often is a property of the reaction. For instance, with trioctylphosphine selenium and cadmium carboxylates, full yield is reached with minutes to hours. Homogeneously dissolved selenium on the other hand is a precursor with a low reactivity, resulting in a low reaction yield in combination with cadmium carboxylates. A solution introduced in the case of the PbSe synthesis, is the use of additives that speed up the reaction.

Still another problem that occurs when using hot injection methods is that these often require expensive chemicals, such as trioctylphospine. Jasieniak et al. describe in "Phosphine-Free Synthesis of CdSe Nanocrystals" a synthesis method that is phosphine free, but this results in a slow synthesis and the need for an inert nitrogen atmosphere.

There is still a need for an efficient synthesis method for metal selenides.

SUMMARY OF THE INVENTION

It is an object of embodiments of the present invention to provide good methods and precursors or precursor compositions for synthesizing nanoparticles.

It is an advantage of embodiments according to the present invention that the precursor proposed is highly reactive thus assisting in a full yield synthesis. It furthermore is an advantage of at least some embodiments that high yields can be obtained already within short time scale, e.g. within a few minutes.

It is an advantage of embodiments of the present invention that the conversion efficiency by which nanoparticles can be made from initial precursor materials, can be up to 20 to 30 times higher than for prior art methods. In other words, according to embodiments of the present invention, the amount of precursor materials required can for some precursors be up to 20 to 30 times less than in prior art methods.

It is an advantage of embodiments of the present invention that the amount of solvent needed to obtain a certain amount of nanoparticles can be reduced compared to prior art methods.

It is an advantage of embodiments according to the present invention that the precursor is not oxygen sensitive or water sensitive, allowing the synthesis to take place in atmospheric or ambient conditions. It thus is an advantage that the requirements for using a controlled atmosphere can be relaxed. Running the reaction under ambient conditions thereby does not compromise the quality of the end product.

It is an advantage of embodiments according to the present invention that the precursors used for synthesis are easy to handle.

It is an advantage of embodiments according to the present invention that the synthesis allows for using established strategies for tuning the nanoparticle size at full yield, e.g. by using different ligands, different concentrations of the chemicals or at adapted yield by using different ratios of the chemicals. It thus is an advantage that the formation of nanoparticles with excellent control over size can be obtained, and this over a broad size range.

It is an advantage of embodiments according to the present invention that monodisperse nanoparticle sols, can be obtained, i.e. that the standard deviation on the size of the nanoparticles can be 5% of the nanoparticle diameter or less.

It is an advantage of embodiments according to the present invention that the precursor proposed is a low cost precursor.

It is an advantage of embodiments according to the present invention that the method allows for easy up-scaling of the production process and that the method is reproducible and can be automated.

The above objective is accomplished by a method and precursors or precursor compositions according to the present invention.

The present invention relates to a method for synthesis of nanoparticles of metal selenide, metal selenide alloys, metal chalcogenide comprising at least selenium or metal chalcogenide alloys comprising at least selenium. The method may be for synthesis of nanoparticles of binary metal selenide nanoparticles or any alloy thereof. The method may be for synthesis of nanoparticles of metal selenides including binary, ternary, quaternary, etc. compounds, their metal selenide alloys or metal chalcogenides alloys of these materials, where part of the selenium is replaced by one or more other chalcogens, e.g. be replaced by sulfur and/or tellurium. The method comprises obtaining a heterogeneous dispersion of powder of at least selenium in a first solvent at a first temperature, e.g. low temperature, the first temperature being such that the heterogeneous dispersion comprises at least a fraction of undissolved powder in the solvent, and providing a metal cation precursor and introducing the heterogeneous dispersion into a second solvent, the second solvent being at a second temperature higher than said first temperature, allowing, upon introduction of the heterogeneous dispersion, dissolution of at least the fraction of the powder resulting in nucleation of the nanoparticles. The nanoparticles typically may incorporate the metal cation and the selenium. It is an advantage of embodiments according to the present invention that by using the new precursor being a dispersion of powder in a solvent, the reaction can have full yield. The second temperature may be a temperature at which the powder of at least selenium dissolves. Providing a metal cation precursor may be performed by providing the metal cation precursor in the second solvent, e.g. such that the second solvent comprises the metal cation precursor before introducing the heterogeneous dispersion. Providing a metal cation precursor is performed by providing the metal cation precursor in the heterogeneous dispersion, prior to its introduction into the second solvent.

Obtaining and/or introducing may be performed under atmospheric conditions. It is an advantage of embodiments according to the present invention that no protective or inert atmosphere needs to be created for performing the synthesis, thus resulting in an easy synthesis method with reduced requirements compared to the prior art, e.g. still allowing to obtain good yield.

The first and/or the second solvent may be a non-coordinating solvent. Alternatively, the first and/or the second solvent is a coordinating solvent. The first and/or the second solvent may be a mixture of solvents, e.g. a mixture of non-coordinating solvents and coordinating solvents. It is an advantage of embodiments according to the present invention that a wide variety of solvents can be used, all resulting in a synthesis process providing a high yield. Such flexibility can be used for relaxing requirements of compatibility of the selected solvents with other chemicals or conditions in the process.

The method furthermore may comprise selecting or tuning any or a combination of a concentration or ratio of concentrations of components in the dispersion and/or of the second solvent used, a type of the first solvent or a type of the second solvent as function of a predetermined dimension of the nanoparticles to be obtained. It is an advantage of embodiments according to the present invention that by selecting the solvent used, the size of the nanoparticles that will be obtained can be controlled, over a wide range of nanoparticle sizes.

The method furthermore may comprise adding ligands with a selected or tuned chain length for obtaining a predetermined dimension of the nanoparticles.

Introducing the heterogeneous dispersion into a second solvent may comprise performing hot injection.

The method furthermore may comprise after said obtaining a heterogeneous dispersion and after said introducing into a second solvent, the steps of forming a shell around the nanoparticles already formed. It is an advantage of embodiments according to the present invention that core-shell particles can be manufactured using the synthesis method as described above for the formation of the core and using any suitable technique for the formation of the shell, resulting in a less complex manufacturing technique than at least some of the prior art systems and in efficient formation of core-shell particles.

The shell material may comprise nanoparticles of metal selenide, metal selenide alloys, metal chalcogenide comprising at least selenium or metal chalcogenide alloys comprising at least selenium, and forming the shell may comprise obtaining a second heterogeneous dispersion of powder of one or more of the group of selenium, sulfur or tellurium in a third solvent at a third temperature, the third temperature being such that the heterogeneous dispersion comprises at least a fraction of undissolved powder in the solvent, and introducing the second heterogeneous dispersion into a fourth solvent comprising the nanoparticles already formed and a metal cation precursor, the solvent being at a fourth temperature higher than said third temperature allowing, upon introduction of the second heterogeneous dispersion, dissolution of the power resulting in nucleation of shell formation around the core.

The method furthermore may comprise quenching the reaction mixture after formation of the nanoparticles.

The present invention also relates to a precursor for synthesis of nanoparticles of metal selenide, metal selenide alloys, metal chalcogenide comprising at least selenium or metal chalcogenide alloys comprising at least selenium. The precursor may be for synthesis of nanoparticles of binary metal selenide or any alloy thereof. The precursor may be for synthesis of nanoparticles of metal selenides including binary, ternary, quaternary, etc. compounds, their metal selenide alloys or metal chalcogenides alloys of these materials, where part of the selenium is replaced by one or more other chalcogens, e.g. be replaced by sulfur and/or tellurium. The precursor being a heterogeneous dispersion of at least selenium powder in a solvent, the at least selenium powder comprising at least a fraction being not dissolved.

The first and/or the second solvent may be a non-coordinating solvent. Alternatively, the first and/or the second solvent is a coordinating solvent. The first and/or the second solvent may be a mixture of solvents, e.g. a mixture of non-coordinating solvents and coordinating solvents. The solvent may beoctadecene.

The present invention also relates to the use of a precursor as described above for the synthesis of nanoparticles of metal selenide, metal selenide alloys, metal chalcogenide comprising at least selenium or metal chalcogenide alloys comprising at least selenium.

The present invention furthermore relates to the use of a precursor as described above, for the synthesis of core-shell particles, wherein a precursor as described above is used for manufacturing of the core.

The present invention also relates to a nanoparticle, the nanoparticle having a metal selenide composition, metal selenide alloy composition, metal chalcogenide composition comprising at least selenium or metal chalcogenide alloy composition comprising at least selenium, the nanoparticle being made using a method as described above.

The nanoparticle furthermore may comprise a shell composed of a different metal selenide.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 3c illustrates the yield as function of time.

FIG. 4a illustrates a brightfield TEM image, FIG. 4b illustrates a size histogram for different quantum dots, FIG. 4c illustrates an XRD pattern in combination with the expected XRD peaks for the zinc blende CdSe structure and FIG. 4d illustrates a Rutherford backscattering spectrum indicating backscattering by Se and Cd.

FIG. 10a and FIG. 10b illustrate respectively the normalized absorption and luminescence spectra and FIG. 10c illustrates the number of shell grown.

FIG. 14a to FIG. 14d illustrate material characterisation results for ZnSe particles made using a synthesis method according to an embodiment of the present invention, wherein FIG. 14a shows the UV-vis spectra, FIG. 14b illustrates the peak position as function of time after initiating the synthesis, FIG. 14c illustrates the XRD spectrum and FIG. 14d illustrates a TEM image of a particle.

Figure 1:
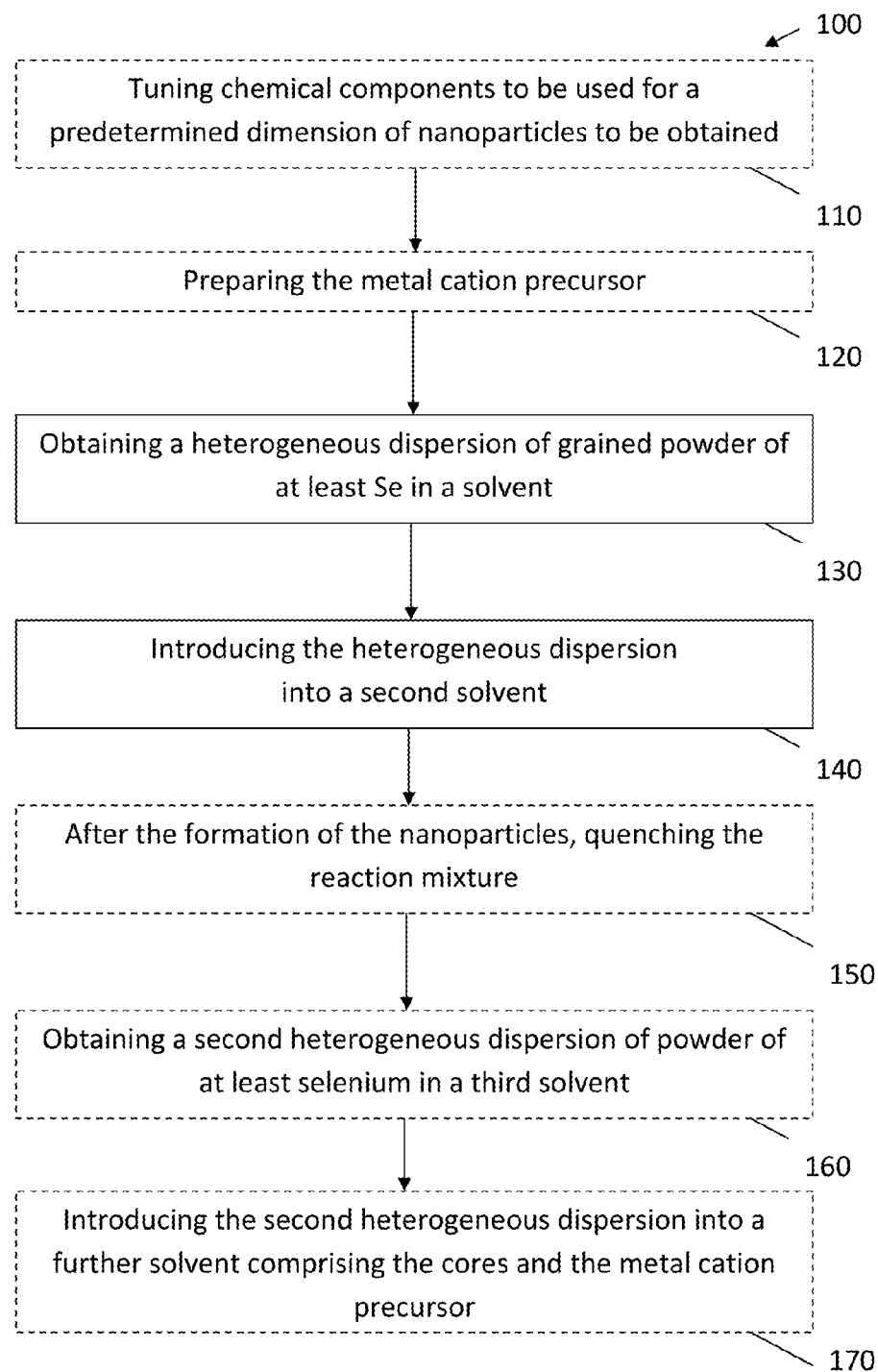
FIG. 1 illustrates different steps of a method for synthesizing nanoparticles according to an embodiment of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in the description or the claims of the present invention reference is made to atmospheric conditions, reference is made to conditions wherein no inert atmosphere (such as a nitrogen or argon atmosphere) is created for performing interaction but wherein the composition of the atmosphere as present as of nature is maintained as environmental condition for performing the interaction. Typical elements that are present in such atmospheric conditions are oxygen and water.

Where in embodiments and/or claims of the present invention reference is made to metal selenide, metal sulfide or metal telluride nanoparticles, reference is made to nanoparticles having a composition being a binary compound such as ZnSe, CdSe, CuSe, $In_2Se_3$, $Ga_2Se_3$, . . . or any compound and/or alloy of these. Examples of compounds and alloys are ternary chalcogenides such as $CuInSe_2$, $CuGaSe_2$, Cd(S,Se), Zn(S,Se), (Cd,Zn)Se, etc., quaternary chalcogenides such as $Cu(In,Ga)Se_2$, $Cu_2ZnSnSe_4$, CuGa(S,Se)$_2$, etc., but also chalcogenides comprising five or more elements such as $Cu(In,Ga)(S,Se)_2$, $Cu_2ZnSn(S,Se)_4$, etc. Examples may be chalcogenides. These may be chalcogenides of the lanthanides, transition metals, group IB metals, group IIB metals, group III metals. Advantageously, use may be made of group IB metals, group IIB metals, group III metals.

Where in embodiments and/or claims of the present application reference is made to nanoparticles, reference is made to any crystalline or amorphous nanoparticle, such as nanocrystals, quantum dots, quantum rods, tetrapods, nanotubes, nanospheres, nanodisc, etc. The term nanoparticles is not limited to any particular shape, but rather refers to any particle having one or more dimensions being 1 µm or less. In some embodiments according to the present invention, all dimensions of the nanoparticle may be 1 µm or less. The term nanoparticles may refer to spherical nanoparticles as well as to non-spherical nanoparticles.

Where in embodiments and/or claims of the present application reference is made to a solvent, reference can be made to a coordinating solvent as well as to a non-coordinating solvent. Where in embodiments and/or claims of the present application reference is made to a coordinating solvent, reference is made to a substance that acts both as solvent for the chemical reactions and as stabilizing agent for the nanoparticles formed. Some examples of coordinating solvents are oleyamine (OLA), tri-octylphosphine oxide (TOPO), oleic acid (OA), etc. This is in contrast with a non-coordinating solvent, wherein the substance only acts as solvent for the chemical reaction. Some examples of non-coordinating solvents are octadecene, hexadecane, dioctylether, diphenylether, etc.

In a first aspect, the present invention relates to a method for synthesizing nanoparticles of metal selenide, metal selenide alloys, metal chalcogenide comprising at least selenium or metal chalcogenide alloys comprising at least selenium. According to embodiments of the present invention, the method for synthesizing can be applied using a variety of techniques, such as for example hot injection synthesis, heating up synthesis, etc., the methods being typically solution-based synthesizing methods. It has been surprisingly found that methods for synthesis as described below or using a selenium precursor as discussed below, advantageously allow full yield and can be performed under atmospheric conditions. Where reference is made to full yield, reference is made to a yield being at least 80%, advantageously at least 90%, more advantageously at least 95%, still more advantageously at least 99%. The above yields may in some embodiments be obtained after 16 minutes of reaction time or less, in some embodiments after 8 minutes of reaction time or less, in other embodiments even after 4 minutes of reaction time or less. Performing the synthesis at atmospheric conditions results in more relaxed environmental conditions, thus resulting in a synthesis method that is relatively easy to perform. The method for synthesizing will be described with reference to FIG. 1, illustrating an exemplary method according to an embodiment of the present invention comprising standard and optional steps.

In one step, the method comprises obtaining 130 a heterogeneous dispersion of selenium powder in a first solvent. The heterogeneous dispersion thus comprises selenium, powder dispersed in an otherwise homogeneous solvent. Where in the present invention reference is made to a heterogeneous dispersion, reference may be made to a dispersion comprising at least a heterogeneous component. Such a dispersion may be a mixture of a heterogeneous dispersion and a homogeneous dispersion, the mixture being referred to as a heterogeneous dispersion. Such a mixture may comprise any fraction of a heterogeneous dispersion. In some advantageous embodiments, such a fraction may be between 1% and 99%, e.g. between 1% and 50%, e.g. between 10% and 50%, although fractions outside these ranges are also envisaged. The dispersion may be a colloidal dispersion. The heterogeneous dispersion thereby is prepared and kept at a first temperature, e.g. low temperature. The first temperature, e.g. low temperature, thereby can be defined as a temperature at which at least a fraction of the powder is not dissolved in the solvent. According to embodiments of the present invention, the heterogeneous dispersion advantageously may be such that—e.g. may be at such a temperature—at least 1 atom out of 1000 atoms of selenium should be present as undissolved particle in the dispersion. In some embodiments, this may be at least 1 atom out of 100 atoms selenium being present as undissolved particle in the dispersion or for example at least 1 atom out of 10 atoms selenium may be present as undissolved particle in the dispersion. In some embodiments, at least 90% or at least 95% of the selenium may be present as undissolved particles in the dispersion. In some embodiments, use may be made of part of selenium being dissolved but at least part of selenium not being dissolved. The solvent used may be a non-coordinating solvent or a coordinating solvent. Some examples of coordinating solvents are oleyamine (OLA), tri-octylphosphine oxide (TOPO), oleic acid (OA), etc. This is in contrast with a non-coordinating solvent, wherein the substance only acts as solvent for the chemical reaction. Some examples of non-coordinating solvents are octadecene, hexadecane, dioctylether, diphenylether, etc.

In another step, the method comprises, introducing 140 the heterogeneous dispersion into a second solvent containing a metal cation precursor. The second solvent may be a non-coordinating or a coordinating solvent or a mixture thereof. It may be the same solvent as the first solvent. It may be a mixture of solvents, comprising one component being the same solvent as the first solvent. The metal cation precursor selected may be any suitable metal cation precursor providing the metal cation to be bound to the selenium for forming the nanoparticle. The second solvent thereby typically is at a second temperature higher than the first temperature at which the first dispersion is prepared. The second temperature typically is sufficiently high that it allows, upon introduction of the heterogeneous dispersion, dissolution of the power, resulting in nucleation of the nanoparticles. Alternatively, the metal cation precursor also may be provided in the heterogeneous dispersion and The metal cation precursor may be obtained readymade or may be obtained by a particular reaction process. The particular reaction process used for preparing the metal cation precursor typically will depend on the metal that is to be used, and may as well be selected depending on the other chemicals that are used. The step of preparing the metal cation precursor 120 also may be part of the present method.

In some embodiments, the present invention also may comprise tuning the chemical components used 110, such as for example the second solvent, for reaching a predetermined dimension for the nanoparticles to be obtained. In one set of examples, where a non-coordinating solvent is used, such as for example octadecene, the nature of the ligand can be selected. This may involve either ligands with a different head group or ligands with a different chain. Selecting 110 or tuning may be selecting aliphatic chains with different length allowing controlling the nanoparticle size obtained at full reaction yield, with shorter ligands giving larger particles.

In some embodiments, the present invention also may comprise tuning the size of the nanoparticles that will be formed by selecting different concentrations and ratios of the chemicals used, such as for example the acid to metal ratio or other ratios and concentrations. Tuning also may be performed by adding amines and phosphines, as this also influences reaction speed, final size and size dispersion. The tuning may for example be based on a look-up-table comprising previously obtained results.

A further optional step, after the nucleation has started and after formation of the nanoparticles, quenching 150 of the reaction mixture may be performed, e.g. by bringing the reaction mixture at a substantially lower temperature. Such quenching may result in the nanoparticles stopping from growing further.

In some particular embodiments, the method can be used for preparing core-shell particles. The method thereby comprises performing any of the embodiments as described above. The method further comprises the steps of forming a shell in any suitable way around the nanoparticles that were already formed using a method according to embodiments of the present invention. In some particular embodiments, wherein the shell material also is a metal selenide, an alloy thereof, a metal chalcogenide comprising at least selenide or an alloy thereof, forming the shell may be performed using a similar technique as the method described above for forming the core. For example, forming the shell may then comprise obtaining 160 a second heterogeneous dispersion of powder of at least selenium in a third solvent at a third temperature, e.g. low temperature, the third temperature being such that dissolution of the powder in the third solvent is prevented. The method also comprises introducing 170 the second heterogeneous dispersion into a fourth solvent comprising the nanoparticles already formed and a further metal cation precursor, the solvent being at a fourth temperature higher than the third temperature, allowing, upon introduction of the second heterogeneous dispersion, dissolution of the power resulting in nucleation of shell formation around the core. The third and or the fourth solvent may be the same solvent or may be a different solvent from the first and/or the second solvent. It may have the same or different properties as the first and/or the second solvent. It thereby is advantageous that core-shell particles can be manufactured using the same technique as described above for the formation of the core as for the formation of the shell, resulting in a less complex manufacturing technique than at least some of the prior art systems and in efficient formation of core-shell particles. In some embodiments, the method may also be used for manufacturing one or more shells in a multi-shell particle. The one or more shells may have the same composition or different composition. For one or more shells, also another technique may be used. The method can be performed in any suitable type of vessel, whereby the vessel is to be suitable for performing the method steps as above. In some particular embodiments, this may be include a vessel being resistant to heat, to quenching, etc. The method thus results in the possibility of efficient growth of one or multiple shells to form core/shell particles.

In a second aspect according to the present invention, the present invention relates to a precursor for the manufacturing of a nanoparticle of metal selenide, metal selenide alloys, metal chalcogenide comprising at least selenium or metal chalcogenide alloys comprising at least selenium. The precursor according to embodiments of the present invention is a heterogeneous dispersion of at least selenium powder in a solvent. The heterogeneous dispersion thereby is such that at least the selenium powder is at least partly not dissolved. The latter typically may imply that the precursor is made and prepared at a temperature sufficiently low. By way of example, for selenium powder and for octadecene as solvent, a typical temperature for precursor preparation is 50° C. The temperature typically should be sufficiently low to obtain a heterogeneous dispersion. The heterogeneous dispersion may have at least 1 atom out of 1000 atoms of selenium in undissolved state in the dispersion, e.g. at least 1 atom out of 100 atoms selenium being in undissolved state in the dispersion, e.g. at least 1 atom out of 10 atoms selenium in undissolved state in the dispersion, e.g. at least 90% or 95% of the selenium being present as undissolved particles in the dispersion. The selenium powder may be grained powder. The size of the grained powder that may be used may be optimized as function of the degree of dissolution that is wanted or as function of the reaction rate. The smaller the grains, the faster the powder can dissolve. This may result in that with fine powder, the concentration can be maintained at the equilibrium concentration, while with increasing grain size, the dissolution may limit the overall reaction rate. One example of a powder that may be used is e.g. selenium powder mesh-200 (filtered through a 200 mesh screen). The powder particles than typically are smaller than 74 μm. The exemplary powder has a 99.9 trace metal, but it will be clear that embodiments are not limited thereto.

The solvent used may be a non-coordinating solvent or a coordinating solvent. Some examples of coordinating solvents are oleyamine (OLA), tri-octylphosphine oxide (TOPO), oleic acid (OA), etc. This is in contrast with a non-coordinating solvent, wherein the substance only acts as solvent for the chemical reaction. Some examples of non-coordinating solvents are octadecene, hexadecane, dioctylether, diphenylether, etc. Further features and characteristics may be as described in the first aspect of the present invention.

In a third aspect, the present invention relates to the use of a precursor for the manufacturing of a nanoparticle of metal selenide, metal selenide alloys, metal chalcogenide comprising at least selenium or metal chalcogenide alloys comprising at least selenium. The precursor according to embodiments of the present invention is a heterogeneous dispersion of at least selenium powder in a solvent. The heterogeneous dispersion thereby is such that at least the selenium powder is not dissolved or at least partly not dissolved. The use of the precursor may be a use as described in the first aspect, having the same features and advantages as described above.

In a fourth aspect, the present invention relates to a nanoparticle having a metal selenide composition, a metal selenide alloy composition, a metal chalcogenide composition comprising at least selenium or a metal chalcogenide alloy composition comprising at least selenium, the nanoparticle being made using a method as described in the first aspect.

In one particular embodiment, the nanoparticle may be a core-shell particle, comprising both a core and a shell. According to a particular embodiment, such a core-shell particle may have a core made using a method as described above and a shell composed of a different material made in any suitable way.

By way of illustration, embodiments of the present invention not being limited thereto, a number of experimental results are discussed below, illustrating features and examples of some embodiments of the present invention.

Example 1

By way of illustration, embodiments of the present invention not being limited thereto, a further number of experimental results on the manufacturing of nanoparticles and the characterisation thereof will further be discussed, illustrating features and advantages of embodiments of the present invention.

In the experiments discussed below, the following chemicals were used: cadmium oxide (99.99%, Alfa Aesar), 1-octadecene (ODE, 90%, Alfa Aesar), oleic acid (OA, 90%, Alfa Aesar), behenic acid (97% Fluka), arachidic acid (99%, Sigma), palmitic acid (98%, Merck), myristic acid (99%, Sigma), capric acid (99.9%, Merck), dodecanoic acid (99%, Sigma); Se (99.999%, Alfa Aesar, 200 mesh), ZnO (99.999%, Sigma), Squalene (98%, Alfa Aeser). Acetone, chloroform, methanol, ethanol and toluene were all of analytical grade. All chemicals and solvents were used without further purification.

In the experiments discussed below, material characterization was performed using different techniques. x-ray diffraction (XRD) has been used to analyze the crystal structure of the nanocrystals. The measurements were performed using a Thermo scientific ARL X'TRA model. XRD samples were typically prepared by dropcasting a dispersion of QDs in an 80:20 hexane:heptane mixture on a silica substrate. Bright field transmission electron microscopy (TEM) images were used to analyse the size, shape and size dispersion of the nanocrystals. The images were taken using a Cs corrected JEOL 2200 FS microscope. The samples were prepared by dropcasting a solution on a carbon coated copper grid. Rutherford backscattering spectrometry was performed by measuring backscattered He+ ions accelerated to an energy of 3.71 MeV with an NEC 5SDH-2 Pelletron tandem accelerator. RBS samples were made by spincoating a thin layer (2 monolayers) of nanocrystals on silicon. Quantitative 1H nuclear magnetic resonance spectra were taken. A BrukerAvance DRX 500 spectrometer at the frequency of 500.13 MHz was used. NMR samples were prepared by dissolving a known amount of QDs in toluene-d8. The concentration of the solution was determined using absorption spectra and published values for the CdSe absorption coefficient.

In a first experiment of this set of experiments, CdSe synthesis was performed from a heterogeneous ODE-Se precursor. In this synthesis, according to an embodiment of the present invention, cadmium oxide (0.4 mmole) was added to 10 mL octadecene (ODE) together with 1.2 mmole of myristic acid in a three neck flask with cooler under atmospheric conditions. The mixture was heated up to 270° C. to dissolve the red cadmium oxide in ODE by the formation of cadmium carboxylate complex. The Se precursor was prepared by adding 2 mmole of Se powder (200 mesh) to 10 mL of octadecene (ODE) at room temperature. The resulting unstable dispersion was left stirring, yet no attempt was made to dissolve the Se powder by heating. To prevent the selenium from settling down, the dispersion is vigorously stirred. To initiate the reaction, 1 mL of the heterogeneous ODE-Se precursor was swiftly injected in the colorless reaction mixture containing the Cd precursor. Injection and growth temperature were set at 270° C. and 260° C., respectively. Upon injection, the black color of the Se precursor disappeared immediately and the color of the mixture turned from yellow to orange to red depending on the size of the CdSe nanocrystals formed. The reaction was stopped by thermal quenching using a water bath followed by the injection of 10 mL of toluene. The reaction mixture was purified by the addition of a 1:1 ratio of isopropanol and a 1:1 ratio of methanol respect the toluene added. The resulting turbid solution was centrifuged for 10 minutes at 3000 rpm to obtain a pellet of nanocrystals that was redispersed in toluene. Prior to a second purification step, oleic acid was added in a 10-fold excess respect the acid originally used in the synthesis to replace to original carboxylic acid on the surface of the nanocrystals. Next, the purification was repeated twice to remove all residual reaction products. For quantitative analysis, aliquots were taken at fixed times (5 s, 10 s, 20 s, 30 s, 40 s, 1 min, 2 min, 3 min, 5 min, 7 min and 10 min). The aliquots were injected in a known amount of chloroform and the solutions weighted. The solutions were purified adding isopropanol and methanol and centrifuged at 5000 rpm for 20 minutes. The aliquots were then redissolved in chloroform and UV-vis spectra were taken. The absorbance at 300 nm was used to calculate the yield through the volume fraction and relating it to the amount of selenium reacted respect the amount injected. The size of the particles was calculated from the position of the first exciton peak while the size dispersion was calculated using the half width at half maximum. The heterogeneous mixture for the precursor used in the above described synthesis differs markedly from the homogeneous Se precursor obtained by dissolving Se in octadecene at elevated temperature for a prolonged time, as originally proposed by Jasieniak et al.

For reasons of comparison, CdSe quantum dots were also synthesized from a homogeneous ODE-Se precursor, in this case using the method as described in J. Jasieniak et al., J. Phys. Chem. B 2005, 109, 20665-20668. A homogeneous ODE-Se precursor was prepared by heating up 0.1263 g of Se powder in 16 mL of ODE under nitrogen atmosphere for 2 h and 25 min. the Cd oleate precursor was prepared by dissolving 0.4275 g of CdO in 10 g of oleic acid and heated up to 250° C. until complete dissolution. The synthesis was performed by adding 0.3 mmole of Cd-oleate and 7.75 mL of ODE in a three neck flask and flushing the mixture at 100° C. for 30 minutes. Afterwards, the temperature was raised to 260° C. and 3 mL of the homogeneous ODE-Se precursor was injected. After injection, the reaction temperature was set to 235° C. After the desired time, the reaction was stopped by quenching with a water bath followed by the injection of 10 ml of toluene. Next, the solution was purified adding an amount of isopropanol equal to the toluene added and then adding methanol until the solution became turbid. The dispersion was centrifuged and the thus obtained nanocrystal pellet was redispersed in toluene and the process is repeated twice. During the synthesis aliquots are taken in a time range from 2 to 85 minutes to study the yield development of the reaction.

For distinguishing between the experiment according to an embodiment of the present invention, and the experiment based on a homogeneous precursor for reasons of comparison, reference will be made to both precursors as heterogeneous and homogeneous ODE-Se, respectively. In the following, material analysis of different properties of the materials will be discussed.

Figure 2A:
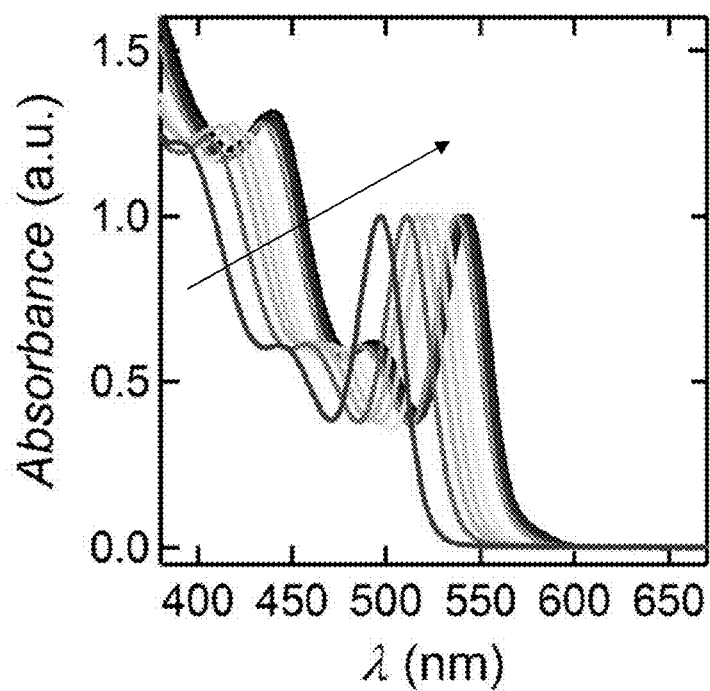
FIG. 2a to FIG. 2c illustrate characterization results as function of time during the synthesis of CdSe nanocrystals according to an embodiment of the present invention, wherein in FIG. 2a the absorption spectra obtained for aliquots taken at the indicated time after injection are shown, in FIG. 2b the time evolution of the nanocrystal diameter is shown as well as the size dispersion and in FIG. 2c the time evolution of the amounts of product formed and unreacted product are indicated.
Figure 2B:
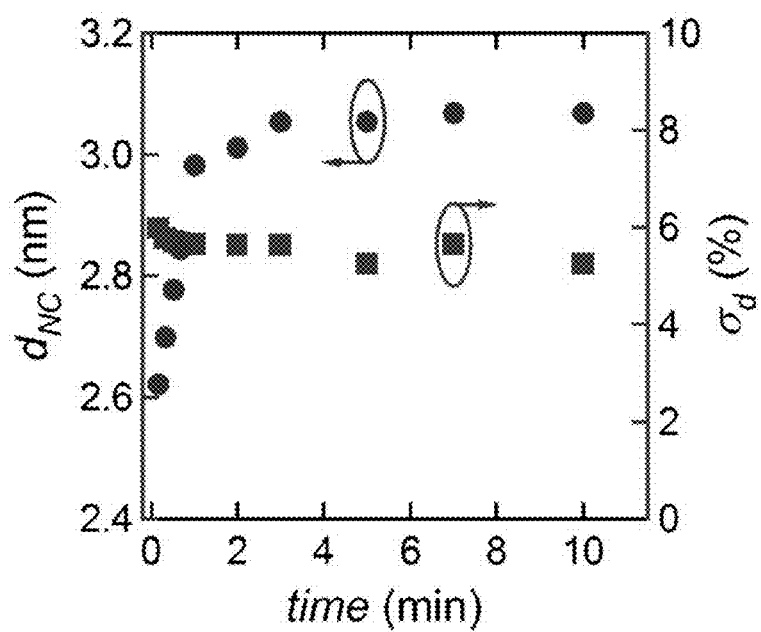
Figure 2C:
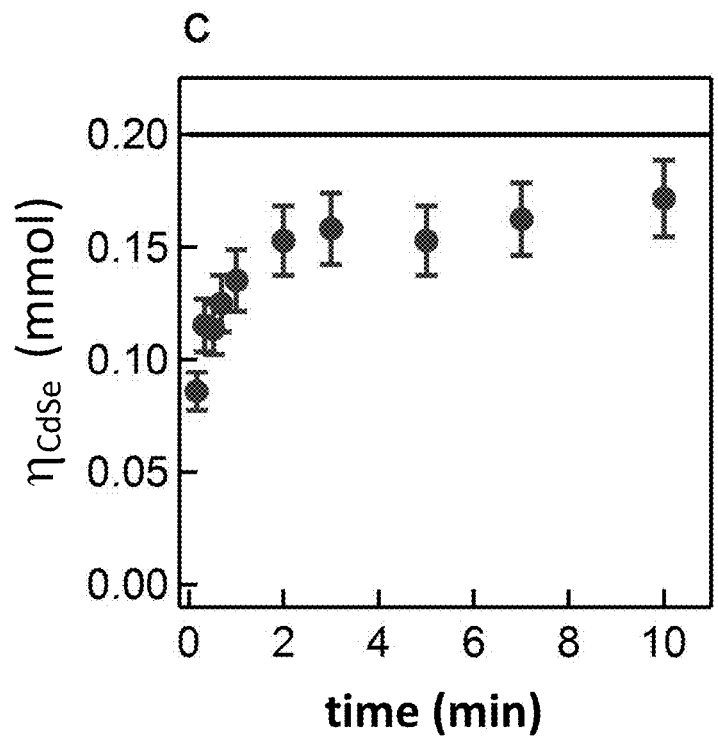

FIG. 2a to FIG. 2c summarizes the characteristics of a reference synthesis where CdSe nanocrystals were synthesized by injecting 1 mL of the standard heterogeneous ODE-Se precursor under ambient atmosphere in a solution obtained by dissolving cadmium oxide (0.4 mmol) in a mixture of myristic acid (1.2 mmol) and octadecene (10 mL) at elevated temperature (270° C.). The UV-Vis absorption spectra of aliquots taken between 5 seconds and 10 minutes after the injection, as shown in FIG. 2a, are characteristic of monodisperse CdSe QD dispersions, where the absorbance at short wavelength and the maximum wavelength and width of the first exciton peak allow for a detailed analysis of the reaction yield, the nanocrystal diameter (dNC), the size dispersion ($\sigma_d$) and the nanocrystal concentration. In FIG. 2a, the results are shown, whereby the arrow indicates increasing time after initiation of the synthesis (5 s, 10 s, 20 s, 30 s, 40 s, 1 min., 2 min., 3 min., 5 min, 7 min, 10 min.) As shown in FIG. 2b, dNC (indicated by disks, corresponding with the y-axis on the left hand side) rapidly increases after injection and remained steady—in this case at about 3.1 nm—after 3 minutes of reaction. At the same time, the size dispersion $\sigma_d$ (indicated by squares, corresponding with the y-axis on the right hand side) remains low, at about 5-6%. Mimicking the development of the nano-crystal diameter dNC, also the reaction yield as determined using absorption spectroscopy evolved quickly from 40% after 5 s to 85% (i.e., close to full conversion) after 5 minutes. This conclusion was confirmed by XRF analysis of the selenium content in the supernatant obtained after purifying the aliquots once.

This conclusion is confirmed by XRF analysis of the selenium content in the supernatant obtained after purifying the final product once. The non reacted selenium is found to be the 15.5% of the amount used in the reaction. Similar results were obtained working either under protective atmosphere or using a saturated hydrocarbon such as hexadecane (HDA) as the solvent. FIG. 2c indicates the time evolution of the amount of CdSe formed as determined from UV-Vis absorption spectroscopy (disks). The full black line indicates the 100% yield level.

Figure 3A:
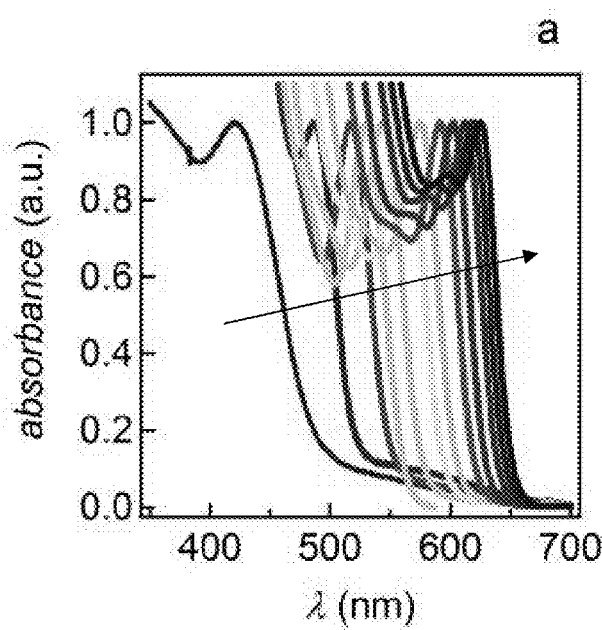
FIG. 3a to FIG. 3c shows characterisation results as function of time during the synthesis of CdSe nanocrystals according to a method known from prior art for comparison reasons, whereby FIG. 3a indicates absorption spectra as function of time after initiation of the synthesis, FIG. 3b reports the average size and size deviation as function of time
Figure 3B:
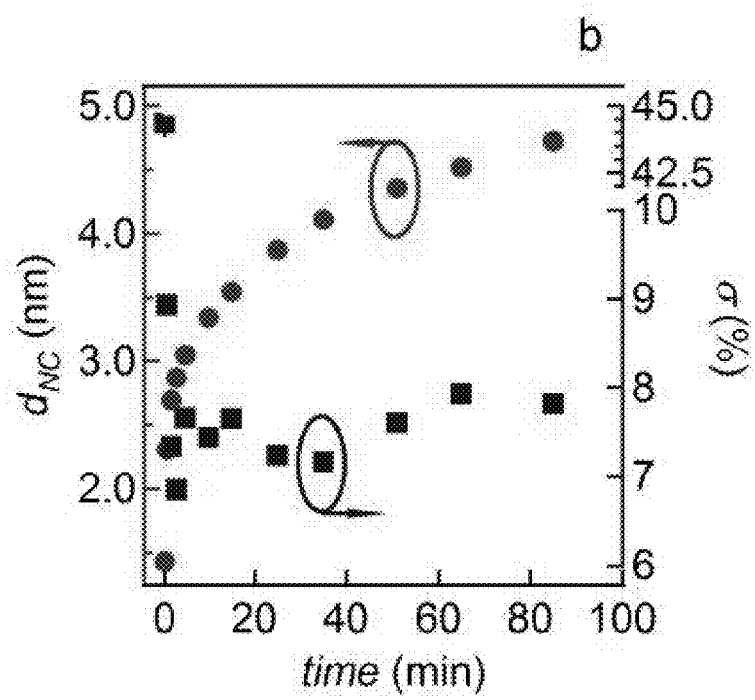
Figure 3C:
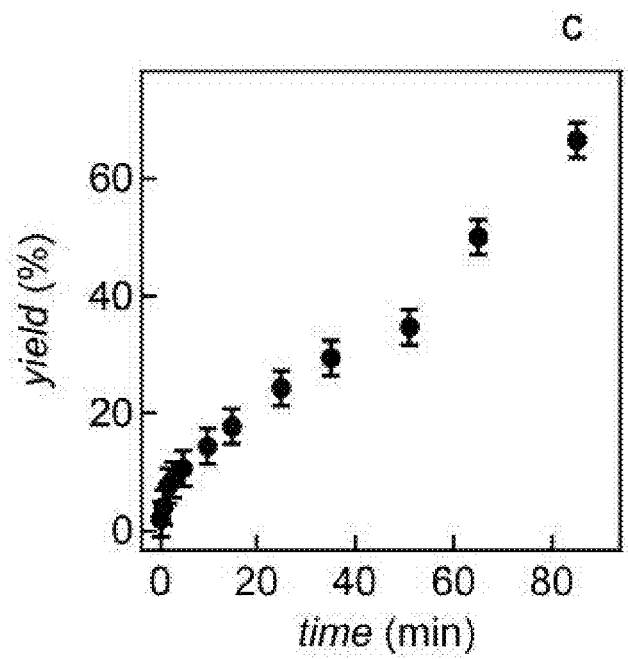

For comparison, FIG. 3a to FIG. 3c summarizes the synthesis development of a typical CdSe nanocrystal synthesis using a homogeneous ODE-Se precursor as originally proposed by Jasieniak et al. The absorption spectra as shown in FIG. 3a already indicate that the nanocrystal NC growth stage was considerably longer for this reaction since the spectra keep shifting to longer wavelengths even after 85 minutes. The arrow in FIG. 3a illustrates how the results shift for increasing synthesis time (2 min., 10 min., 15 min., 25 min., 35 min., 50 min., 65 min. and 85 min.). Although giving access to a wide range of NC diameters as indicated in FIG. 3b (diameter indicated by discs with reference to the y-axis at the left hand side), this tuning of the nanocrystal diameter $d_{NC}$ with time came at the cost of a somewhat increased size dispersion (6-8%) (indicated by squares with reference to the y-axis at the right hand side) and, most notably, a low reaction yield. As shown in FIG. 3c, it takes 10 min for the yield to exceed 10% and it only reached 26% after 85 minutes, in line with yield analysis for this method known in the art. This highlights the difference with the synthesis based on heterogeneous Se precursor in this work.

Figure 3D:
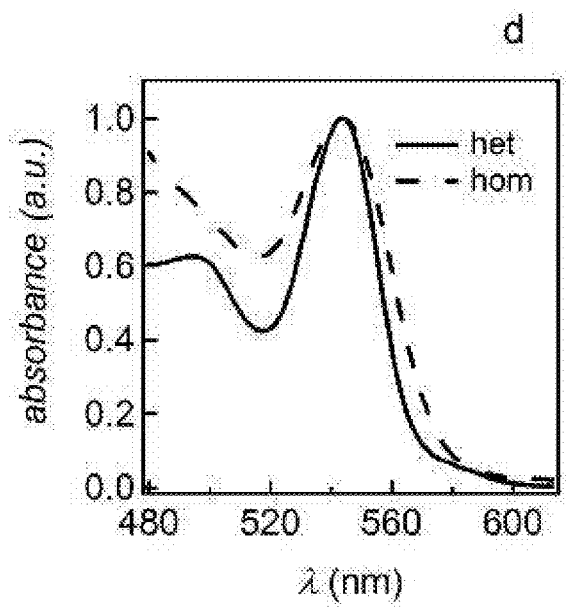
FIG. 3d shows absorbance spectra for reactions performed using a homogeneous precursor as in prior art (dashed line) and using a heterogeneous precursor according to an embodiment of the present invention using a precursor in air (full line).

As a final comparison, FIG. 3d compares the absorption spectra of CdSe NCs with a $\lambda_{1Sh-1Se}$ of 544 nm synthesized with either the homogeneous and the heterogeneous ODE-Se precursor. Apart from the reaction yield, it follows that the fast heterogeneous ODE-Se precursor under ambient also results in an enhanced size dispersion.

Figure 4A:
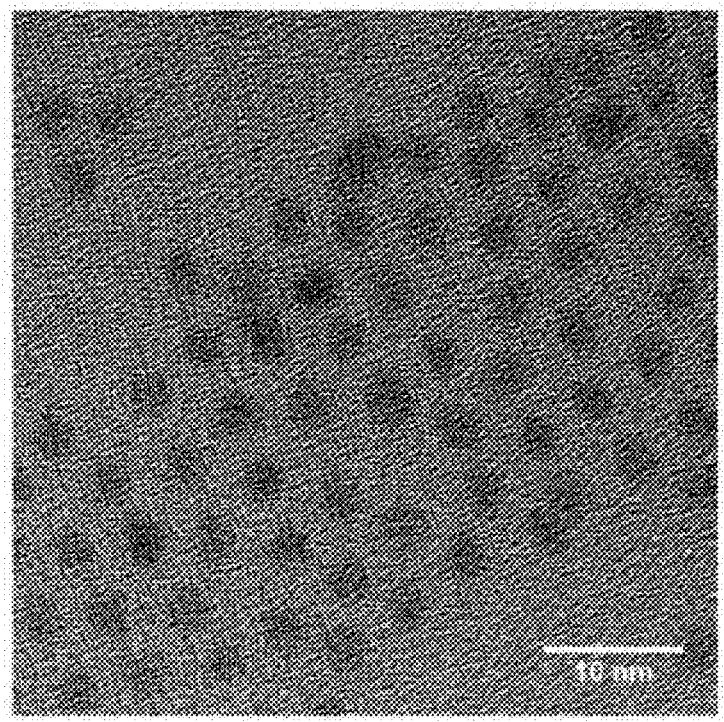
FIG. 4a to FIG. 4d illustrates structural characterization results of CdSe quantum dots synthesized according to an embodiment of the present invention, whereby
Figure 4B:
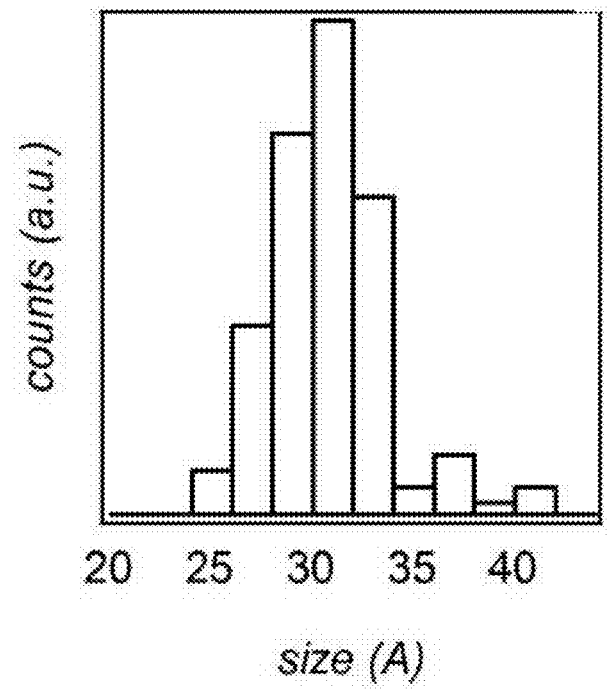
Figure 4C:
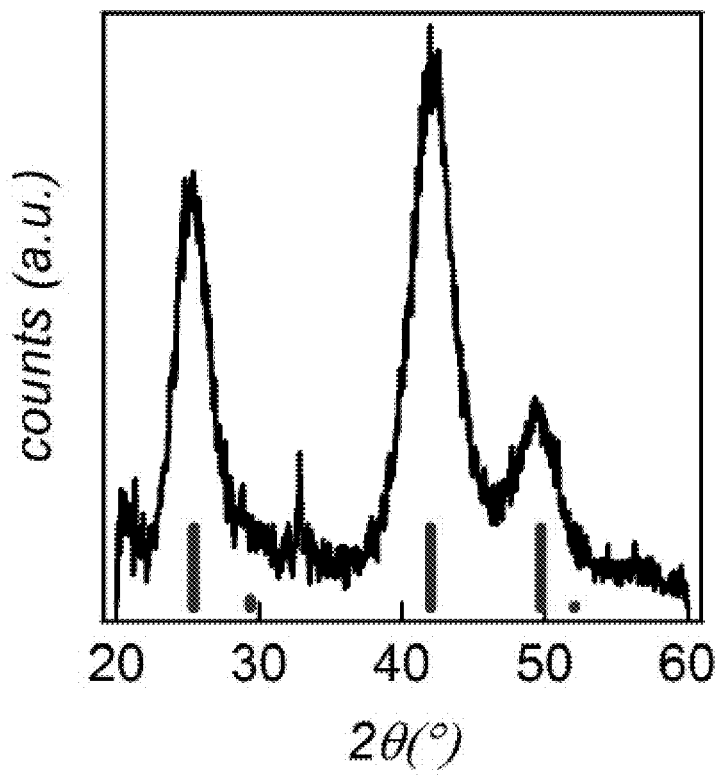
Figure 4D:
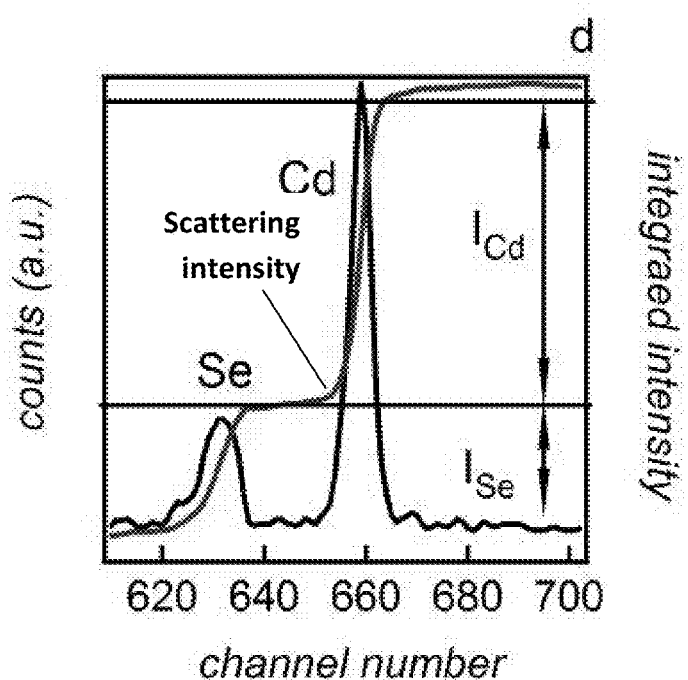

FIG. 4a shows a representative bright field TEM image obtained from the purified reaction product made by the synthesis according to an embodiment of the present invention. The scale bar corresponds to 10 nm. The size histogram obtained by analyzing several TEM images, as shown in FIG. 4b confirms that quasi spherical nanocrystals are formed with an average diameter of 3.0 nm and a size dispersion of 6.7%, in good agreement with the figures estimated from the UV-Vis spectra. The x-ray diffractogram in FIG. 4c demonstrates that the nanocrystals formed have the crystal structure of zinc blende CdSe, a similar result as obtained with the homogeneous selenium precursor. Finally, two signals appear in the Rutherford backscattering spectrum, which we attribute to Se (low energy signal in FIG. 4d) and Cd (high energy signal in FIG. 4d). The measured scattering intensities as function of energy is indicated, as well as an estimate of the integrated intensity $I_{Cd}$ and $I_{Se}$. The ratio of the ($Z^2$ corrected) RBS signals yields a Cd:Se ratio of 1:26±0:1. Hence, similar to many other syntheses of binary nanocrystals such as CdSe, CdTe, PbSe and PbS, the use of a heterogeneous Se precursor leads to CdSe nanocrystals that are cation rich.

Figure 5:
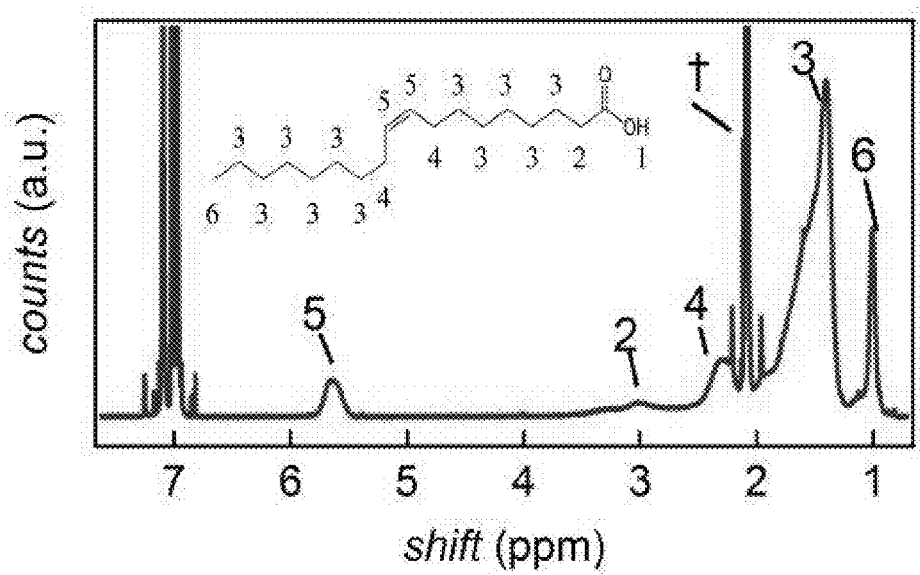
FIG. 5 shows the NMR spectrum of a dispersion of CdSe particles obtained using a synthesis method according to an embodiment of the present invention.

FIG. 5 shows a quantitative $^1$H nuclear magnetic resonance (NMR) spectrum obtained on the purified reaction product—i.e., involving a ligand exchange to oleic acid—dispersed in toluene-d8. Similar to previously published results on CdSe, PbSe and PbS QDs, the spectrum contains the broad resonances characteristic of bound oleate ligands (peak number 3 in FIG. 5), next to the sharp resonance of residual toluene-d8 (†). The different oleate resonances were attributed as indicated in FIG. 5 based on available literature results. Importantly, the ratio between the integrated intensity of the resonance of the oleic acid alkene (5.6 ppm) and methyl (1.0 ppm) protons amounts to 2:3.3. This indicates that only about 10% of the original ligand used in the synthesis (myristic acid in this case) remains after the oleic acid ligand exchange step in the purification procedure.

From the same quantitative experiment the ligand density of the ligand has been calculated and found equal to 3.4±0:2 $nm^{-2}$ based on the methyl resonance.

In a second experiment of this set of experiments, the possibility for size tuning of nanocrystals using a heterogeneous precursor is illustrated. As demonstrated above, the CdSe synthesis using heterogeneous ODE-Se under the reference conditions runs to completion in a few minutes. The nanocrystal diameter $d_{NC}$ reaches a constant value without a significant increase, if any, in size dispersion and the chemical yield of the reaction is close to 100%. This makes the reaction in principle well suited for synthesizing nanocrystal batches with different sizes at full yield, provided that the nanocrystal size can be affected by the reaction conditions.

Figure 6:
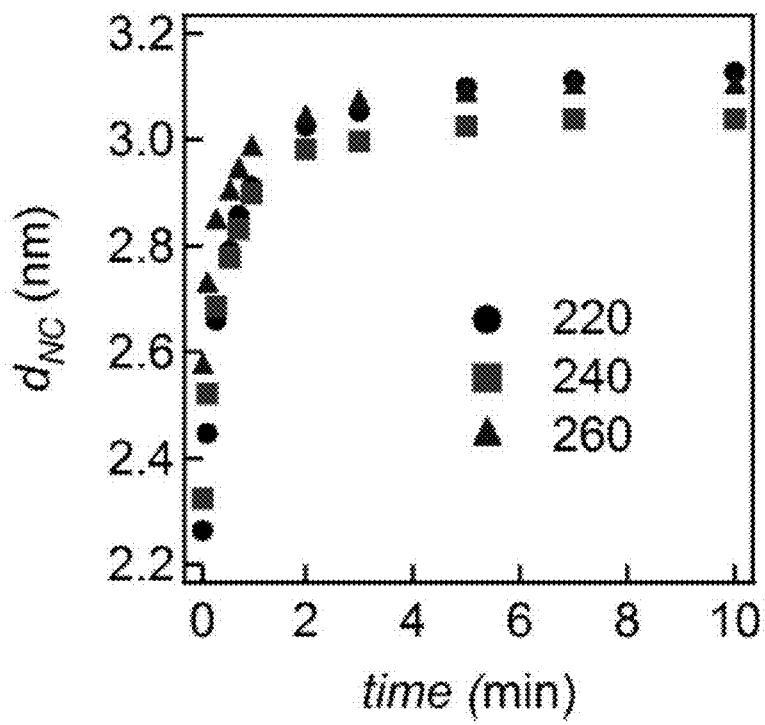
FIG. 6 illustrates the development of the size at different reaction temperatures for reaction conducted with 0.2 mmol of Cd and 0.1 mmol of Se using dodecanoic acid, for synthesis according to an embodiment of the present invention.
Figure 7A:
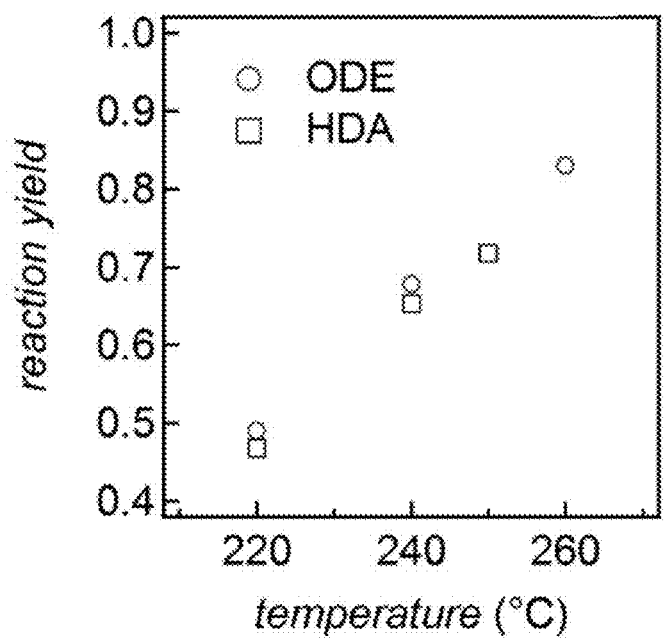
FIG. 7a and FIG. 7b report the yield of the reaction as function of the temperature for ODE and HDA (FIG. 7a) and the change of yield with varying reagent concentration (FIG. 7b) for synthesis according to an embodiment of the present invention.
Figure 7B:
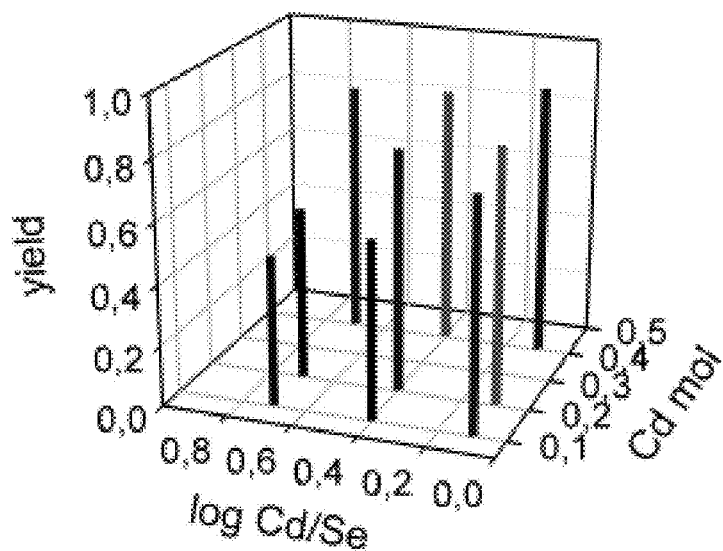

As shown in FIG. 6 illustrating the development of the size of the nanocrystals at different reaction temperatures for reaction conducted with 0.2 mmole of Cd and 0.1 mmole of Se using dodecanoic acid, the diameter of the nanocrystals $d_{NC}$ still reaches a constant value within 3-5 min after injection for growth temperatures in the range of 220-260° C. (220° C. indicated with discs, 240° C. indicated with squares and 260° C. indicated with triangles), $n_{Cd}$ in the range of 0.1 to 0.4 mmole and an $n_{Cd}$:$n_{Se}$ ratio of 1.25-5. All reactions seem to show similar behavior with time with a similar final size. On the other hand, in FIG. 7a it can be seen that the reaction yield at the moment $d_{NC}$ reaches its constant value drops with decreasing temperature to 45-50% at 220° C. More particularly, FIG. 7a reports the yield of the reaction against the temperature. Similar results are obtained using either ODE or HDA as the solvent. A linear dependence is found to be the same for the two solvents indicating the independence of the Se reactivity on the presence of a double bound. Also upon changing the precursor concentration, a significant drop of the reaction yield occurs, especially when the concentration of Se ($n_{Se}$) is changed, as can be seen in FIG. 7b. Values vary from about 50% to 90% when $n_{Se}$ increases from 0.02 to 0.32 mmole. This may indicate that depending on the reaction conditions, part of the selenium is consumed by side reactions and thus unavailable for CdSe formation.

Figure 8A:
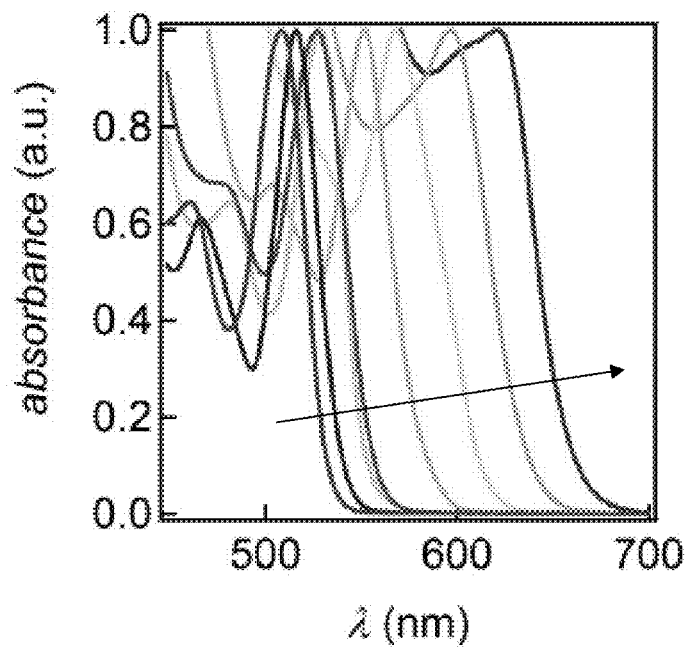
FIG. 8a and FIG. 8b illustrate the effect of the length of the acid used for synthesis on the absorbance spectra of the particles made (FIG. 8a) and on the diameter of the particles made (FIG. 8b) for particles made using a method according to embodiments of the present invention.
Figure 8B:
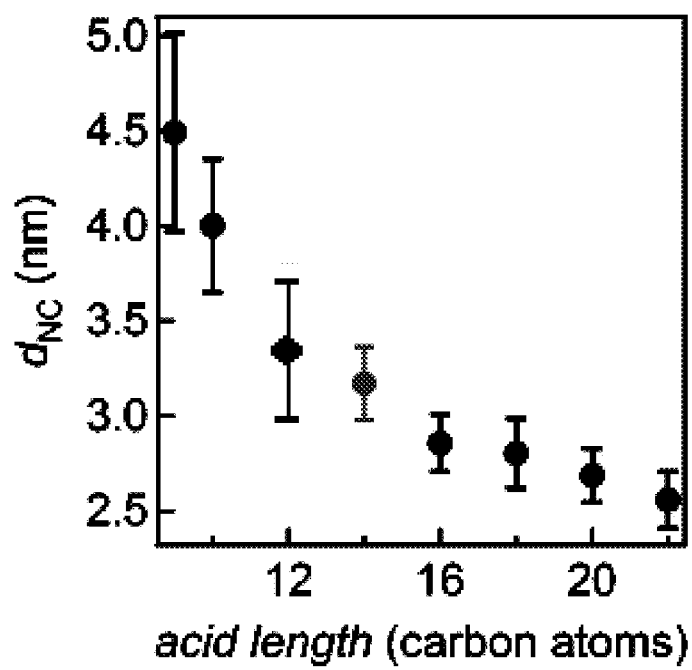

Since the reaction yield depends on the precursor concentration, size tuning at a constant precursor concentration is preferred over size tuning by changing the precursor concentration. A straightforward variable offered by the synthesis is the chain length of the carboxylic acid used to dissolve the CdO and stabilize the resulting NCs. Executing the reactions under standard conditions, one finds that a constant diameter and a yield of 80-85% is obtained within 5 minutes of reaction, regardless of the acid chain length. Moreover, FIG. 8b indicates that by changing the acid chain length from n=22 (behenic acid) to n=10 (decanoic acid) (expressed by carbon atoms), the diameter at the end of the reaction (taken as explained above at 5 minutes) increases from 2.6 to 4.5 nm. Most tunability is found for ligands having n≤16, although for the shortest ligands, this comes with a considerable deterioration of the size dispersion. The latter can also be seen from FIG. 8a, indicating absorbance spectra synthesized using different acid lengths. It can be seen that there is a shift in the first absorption peak towards red with decreasing acid length (the direction of decreasing acid length is indicated by the arrow).

Figure 9:
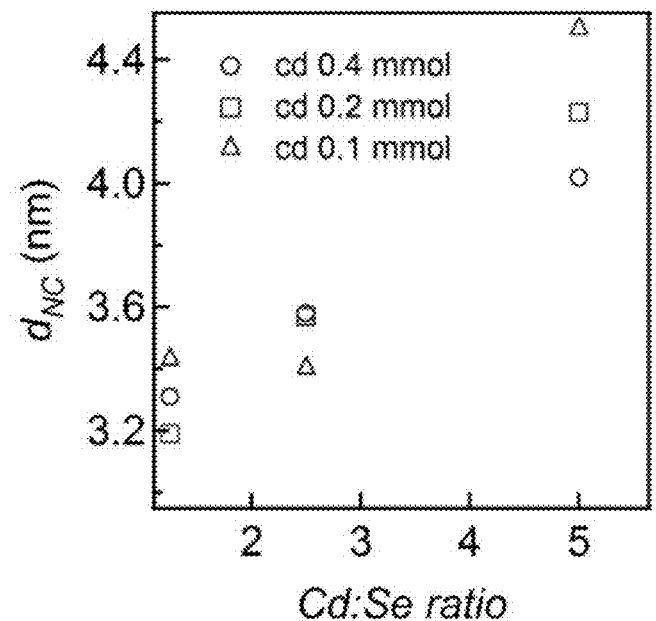
FIG. 9 illustrates the particle diameter for CdSe particles made using a method according to embodiments of the present invention as function of the Cd to Se ratio.

As shown in FIG. 9 the $d_{NC}$ can be additionally tuned by changing the precursor concentration. In line with literature results involving a different CdSe synthesis, an increase of the Se concentration $n_{Se}$ reduces the nanocrystal diameter $d_{NC}$. On the other hand, raising the Cd concentration $n_{Cd}$ leads to larger nanocrystals. This unexpected relation might be due to the concomitant increase of the free acid concentration, which was for convenience taken as proportional to the Cd concentration $n_{Cd}$. In FIG. 9 the particle size as function of the Cd/Se ratio is reported for synthesis performed using an amount of Cd ranging from 0.1 to 0.4 mmole and for a Cd/Se ratio between 1.25 and 5 and dodecanoic acid in the reaction mixture. It illustrates that the size can be tuned between 3 and 4.5 nm.

In a third experiment of this set of experiments, reproducibility of the synthesis is checked, using an automated liquid handler. The experiments made use of a Cd-oleate stock solution that was prepared by adding 0.5136 g of CdO in a flask containing 2.403 g of oleic acid and 157.57 g of ODE. This solution was heated up to 250° C. until it became colorless and allowed to cool down afterwards. A heterogeneous ODE-Se suspension was prepared by adding 0.7112 g of Se and 70.6325 g of ODE. For a single automated synthesis, the liquid handler was programmed to add 2.7 mL of the Cd-oleate stock solution (0.054 Cd mmole) to an 8 mL vial. The solution was then heated up to 250° C. followed by the addition of 270 ml of the ODE-Se solution. This solution itself was continuously stirred to guarantee the homogeneous distribution of the Se powder in the dispersion. The temperature was kept constant and the reaction was then stopped after 4 minutes by quenching with a water bath and then toluene. Finally, 1 mL of oleic acid was added to stabilize the QDs. The solution did not receive any further purification. A good reproducibility could be seen.

In a fourth experiment of this set of experiments, the formation of core-shell particles is illustrated. The photoluminescence quantum yield (PLQY) of CdSe core QDs is in general relatively low. For CdSe QDs synthesized under ambient conditions using heterogeneous ODE-Se, we measure typical values after purification of about 7%. In line with the low size dispersion, the emission spectra are quite narrow, showing for 2.76 nm QDs a full width at half maximum of about 30 nm. A widely used procedure to enhance the PLQY of core QDs and introduce additional tuning of the material properties is shell growth. In the case of CdSe, especially ZnS and CdS are often used shell materials. In the case of dot-in-dot CdSe/CdS, shell growth typically involves the so called successive ionic layer adsorption and reaction (SILAR) process, in which single layers of Cd and S are formed one at the time by the repetitive addition of Cd and S precursors. In brief, S and Cd precursors were prepared as follows: 0.032 g of sulfur (99.999%, Strem chemicals) was dissolved in 10 mL of ODE at 100° C.; 0.178 g of CdO was dissolved in 3.4 g of oleic acid and 10 mL of ODE and heated up to 250° C. until complete dissolution. The synthesis was performed by adding 1.5 g of n-octylamime (90%, Merck) and 12 mL of ODE in a three neck flask. This solution was kept under nitrogen while stirring at 100° C. for 1 hour. Next, a solution containing 68.2 μmols of CdSe nanocrystals dissolved in hexane was injected. The temperature was raised and when 225° C. was reached, the sulfur solution was added. After ten minutes the cadmium precursor was also added. The process was repeated alternating the two precursors until the desired amount of shells was reached. The amount of solution to be added was calculated in the way to have for each injection a monolayer of one of the two reagents. The reaction was then stopped by quenching and 5 ml of toluene was added. For the purification isopropanol was added in a ratio 1:1 respect the amount of toluene, then methanol was used to precipitate the particles and the solution was centrifuged for ten minutes at 3000 rpm. The purification was repeated twice more dispersing the particles in toluene and precipitating with methanol. Finally the particles were dispersed in toluene.

Figure 10A:
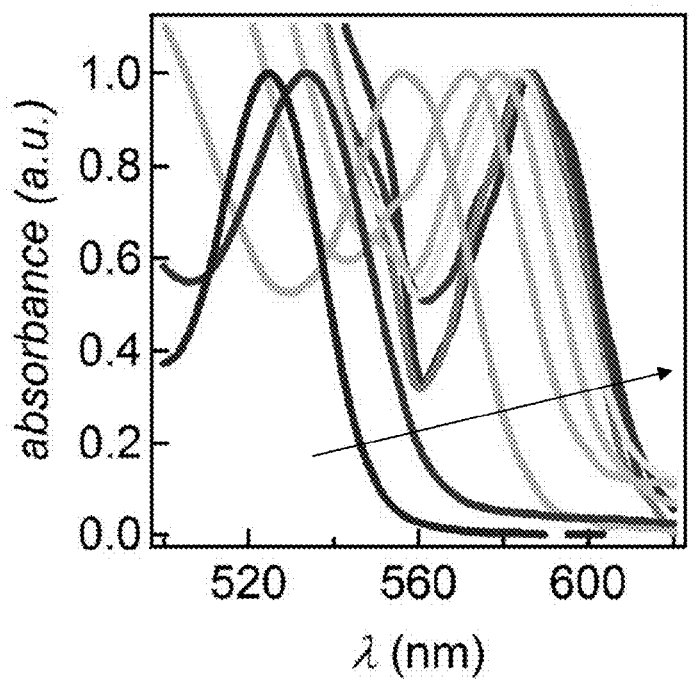
FIG. 10a to FIG. 10c illustrate characterization results for CdSe/CdS core shell particles, whereby the core is made using a method according to an embodiment of the present invention, whereby
Figure 10B:
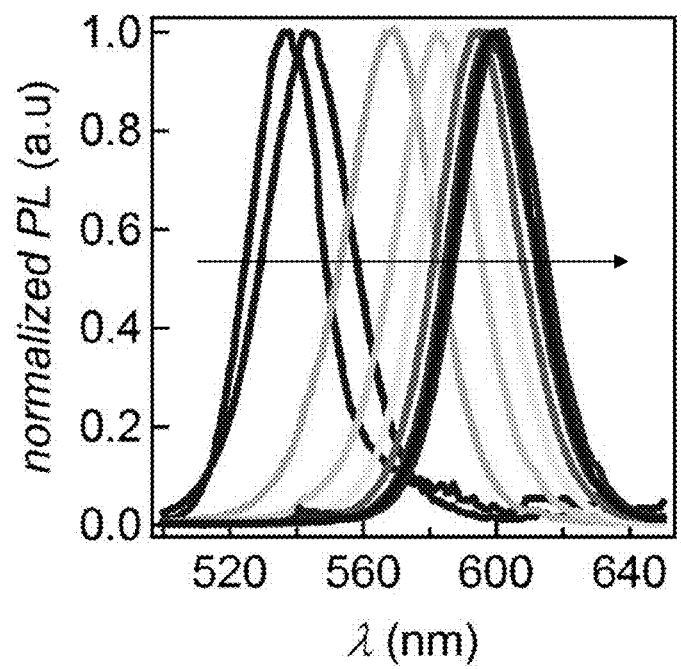
Figure 10C:
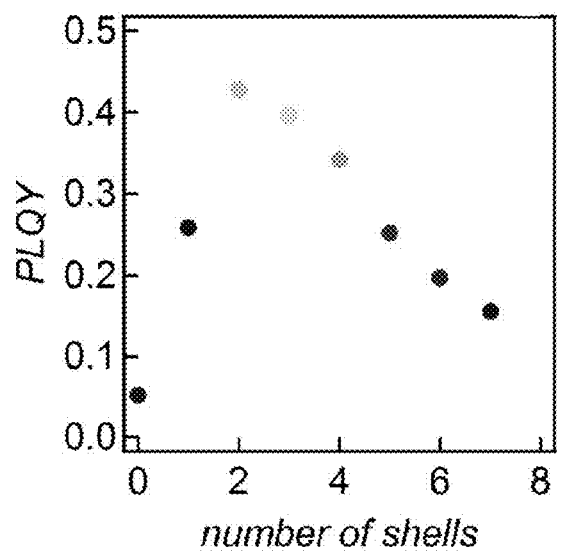

FIG. 10a shows the evolution of the absorption spectrum when CdSe cores synthesized under ambient conditions using heterogeneous ODE-Se are use in a SILAR procedure involving the addition of 7 CdS layers. The spectra—each taken after the completion of a single CdS layer—show the progressive red shift with increasing shell thickness characteristic of the delocalization of the conduction-band electron in the CdS shell. In FIG. 10a, the arrow indicates the direction of increasing shell thickness for the different absorption spectra. The formation of a CdS shell is further confirmed by TEM analysis as will be discussed further. Similar to the absorption spectrum, also the PL spectrum shows a marked red shift after the completion of each CdS layer. The latter is illustrated in FIG. 10b, whereby the arrow illustrates the direction of increasing shell thickness. More importantly, the PLQY quickly increases and reaches a value of 45% when 3 layers of CdS are grown, as can be seen in FIG. 10c. Further growth of CdS leads to a progressive reduction of the PLQY to values of about 20% for 6 CdS layers. A similar behavior has been described for SILAR procedures using CdSe cores synthesized using a protective atmosphere and has been attributed to the enhanced strain or the occurrence of crystal defects with increasing shell thickness. The latter illustrates that the application of a shells to obtain core-shell particles also is advantageous when CdSe cores are synthesized using the heterogeneous Se precursor.

Figure 11:
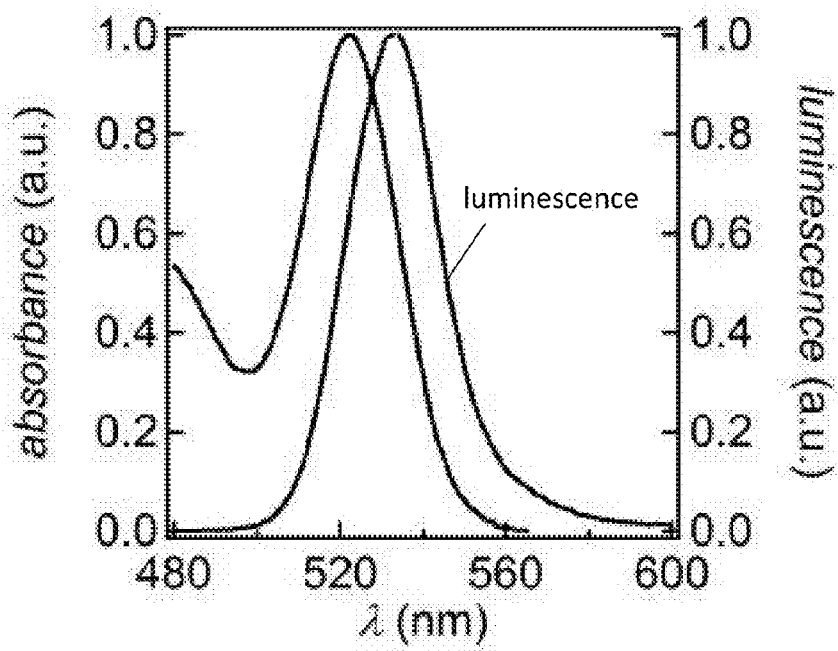
FIG. 11 illustrates the absorption and luminescence spectrum of a 2.7 nm CdSe particle, synthesized using a method according to an embodiment of the present invention.

In FIG. 11, an absorption and luminescence spectrum of a 2.7 nm CdSe particle synthesized using 0.2 mmole of Cd and 0.1 mmole of Se at 260° is shown, whereby the luminescence spectrum shows a narrow peak of about 30 nm as full width at half height and emission peak at 533 nm. These characteristics can be used as a reference for the CdSe/CdS core-shell particles made, in view of a 2.7 nm CdSe particle forming the core of the core-shell particles made.

Figure 12A:
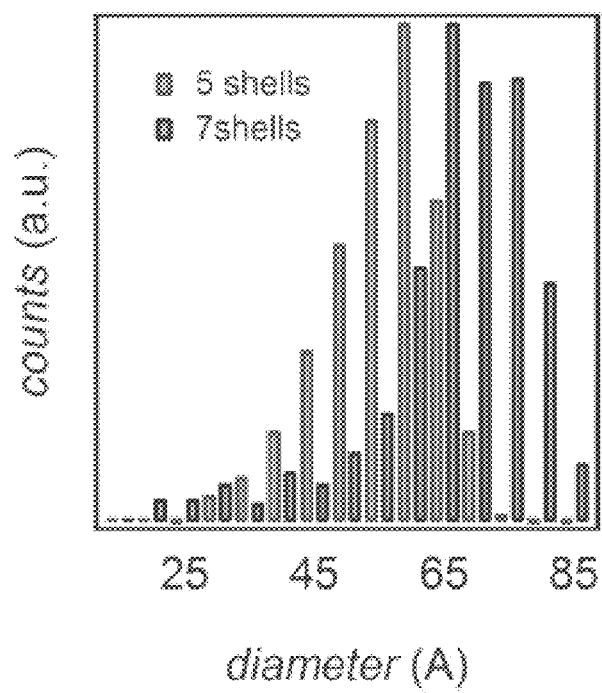
FIG. 12a and FIG. 12b show the result of a TEM analysis of CdSe/CdS core-shell particles in which the core has been made using a method according to an embodiment of the present invention.
Figure 12B:
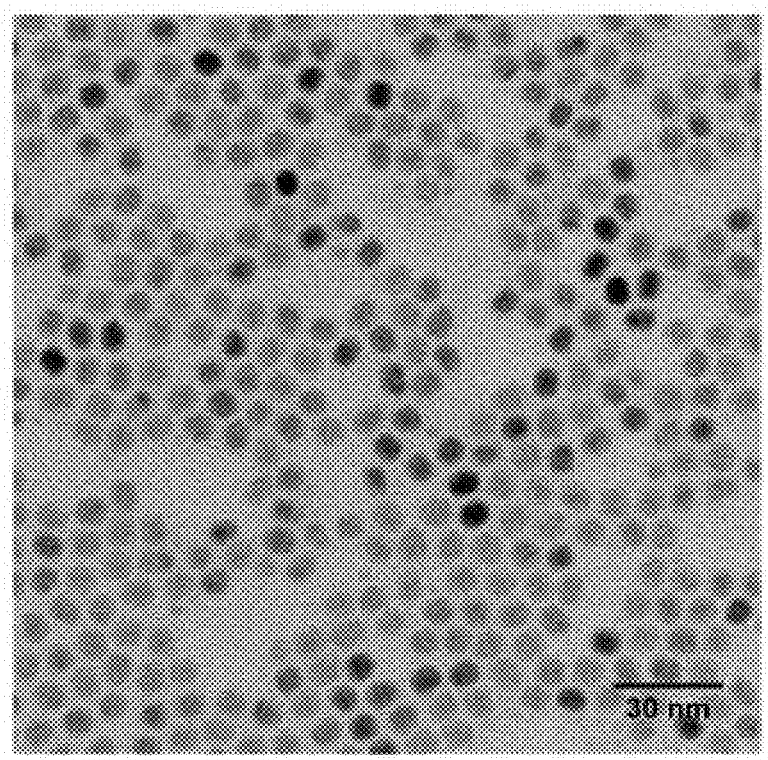

In FIG. 12a the histogram of the TEM analysis conducted on CdSe/CdS after the addition of the 5$^{th}$ and 7$^{th}$ shell on CdSe particles of 2.7 nm is shown, indicating that $d_{NC}$ increases from the initial core size of 2.7 nm to 6.5 and 7.5 nm after the growth of 5 and 7 shells, respectively. This indicates an increase in $d_{NC}$ of 0.65-0.75 nm per CdS layer, in reasonable correspondence with the 0.58 nm expected based on the lattice parameter of the zinc blende CdS unit cell. In FIG. 12b, a TEM image of the CdSe/CdS particles after the addition of 7 shells is reported, showing good monodispersity of the nanocrystals.

In conclusion from the above set of experiments it can be easily seen that using the heterogeneous precursor results in a substantially higher yield, i.e. in few minutes the yield reaches the average value of 80% compared to the 10% yield when using a homogeneous precursor. The difference in reactivity is clear not only from comparison of the yield in absolute value but also the time needed to reach the maximum yield. Using an embodiment of the present invention, the maximum yield is reached after a time comprised between 2 and 5 minutes, while for synthesis according to prior art it takes 85 minutes to reach the 70%, while yield lower than 10% is achieved in the same time range as for embodiments of the present invention. The high reactivity of the precursor may be attributed to the metallic state of the Se that is not coordinated to the ODE. Moreover the reactivity of the homogenous precursor may be affected by the preparation of the reagent resulting in a loss of up to the 50% reactivity depending on the temperature and times used in its preparation. In embodiments of the present invention the effect can be significantly reduced as the precursor can be prepared at room temperature without the need for a thermal treatment. The reaction reaches high yield, however part of the Se does not react, and this is attributed to loss of reactivity due to formation of non-reactive species or formation of the coordinated ODE-Se that is slower and takes longer times to react. The unreacted Se is found in the supernatant after the precipitation of the particles. Further experiments have shown that the yield of the synthesis is also affected by the amount of the Se added.

On the other hand changing the amount of Cd seemed not to affect the yield as experiments performed with Cd/Se ratios of 1.25, 2.5 and 5 gave the yield depending again only on the amount of Se. Finally, as shown, the yield is also influenced by the temperature used in the synthesis. The use of different temperatures can indeed affect the reactivity of the species in the reaction mixture and higher temperature leads to higher yield. It was noticed that the yield behaviour is the same for ODE and HDA, indicating that at given temperature the reactivity of the Se precursor is the same regardless of the saturation of the solvent. This also suggest that the formation of the non-reactive Se during the synthesis is not related to the coordination with the double bond of the ODE that is the accepted coordinated structure for the homogenous ODE-Se precursor. The synthesis developed offers also if compared with homogenous, the possibility to easily tune the size of the particles not acting on the reaction time but on the ligand used or the ratio Cd/Se. However the first case is preferable to the latter as the use of different ratio leads to yields even considerably low than the unity, while as reported in the supplement information, the use of different acids keeps high yield.

Figure 13:
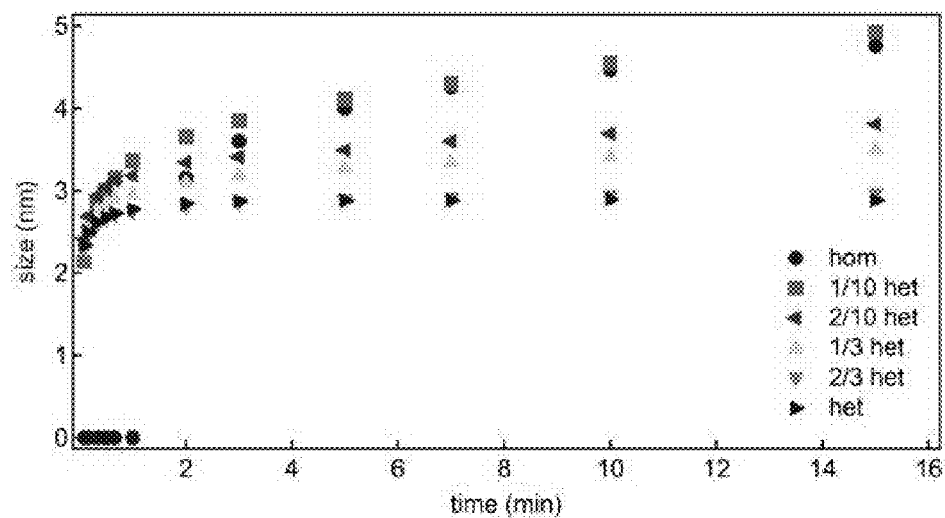
FIG. 13 illustrates the obtained particle size as function of synthesis time for synthesis of particles according to embodiments of the present invention, whereby the Se precursor used is a mixture of a homogeneous precursor and a heterogeneous precursor.

Further by way of illustration, FIG. 13 illustrates the effect of the degree of heterogeneity of the precursor injected on the reaction time and the size of the nanocrystals formed. For the experiment, a reaction mixtures of 0.2 mmole of Cd, 0.6 mmole myristic acid and 10 ml ODE was used. The solution is heated up to 270° C. and a solution (1 ml) of mixed homogenous (hom) and heterogeneous (het) Se precursor is injected. The total amount of Se (hom+het) is the same for all the reactions and is equal to 0.1 mmole. By injection, the temperature drops and it is set to 260° C. Aliquots are taken at times of 5, 10, 20, 30, 40 seconds and 1, 2, 3, 5, 7, 10, 15 minutes. The aliquots are analyzed with UV-vis spectroscopy to calculate the size. The results show that the heterogeneous (100%) precursor behaves like described above, reaching stable size particle after a couple of minutes. The homogeneous (100%) precursor also behaves as known from literature with slow nucleation (no particles detected in the first minute) and slow growth (the size continues to increase after 15 minutes). When a mixture of the homogeneous and heterogeneous precursor is used, for different relative amounts of the two reagents, different results are obtained. It can be seen that applying e.g. 10% heterogeneous Se precursor already results in a fast initial nucleation. Furthermore, the more heterogeneous Se precursor is used in the mixture, the more the synthesis behavior resembles the situation of using only a heterogeneous precursor.

Example 2

Figure 14A:
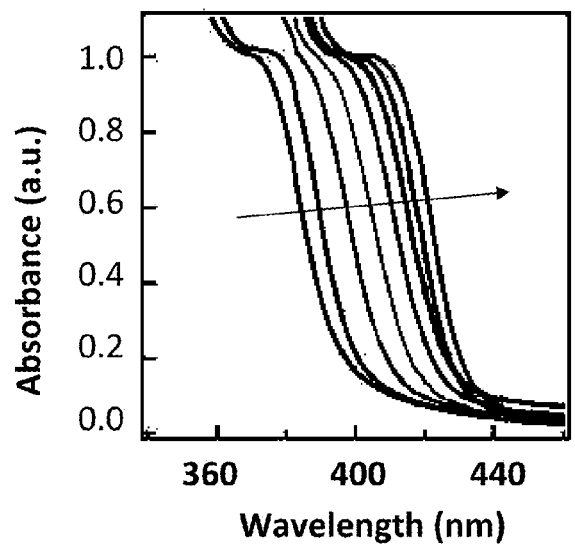
Figure 14B:
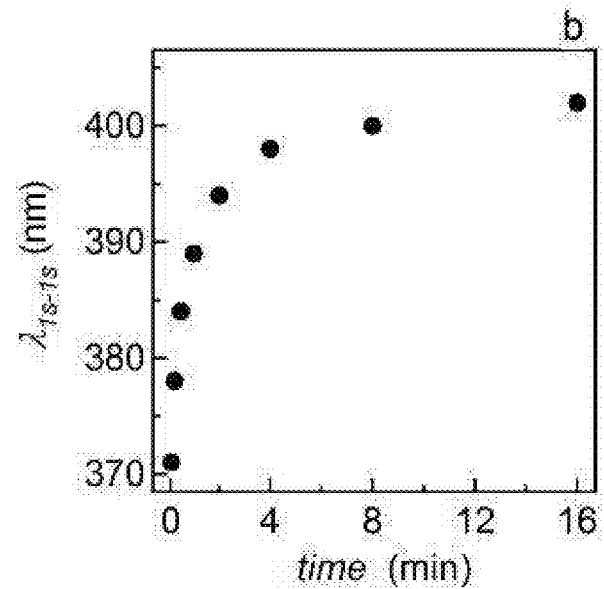
Figure 14C:
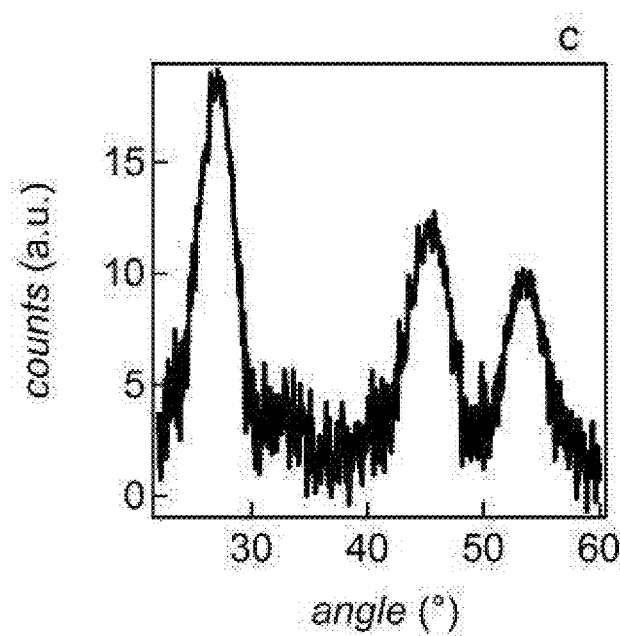
Figure 14D:
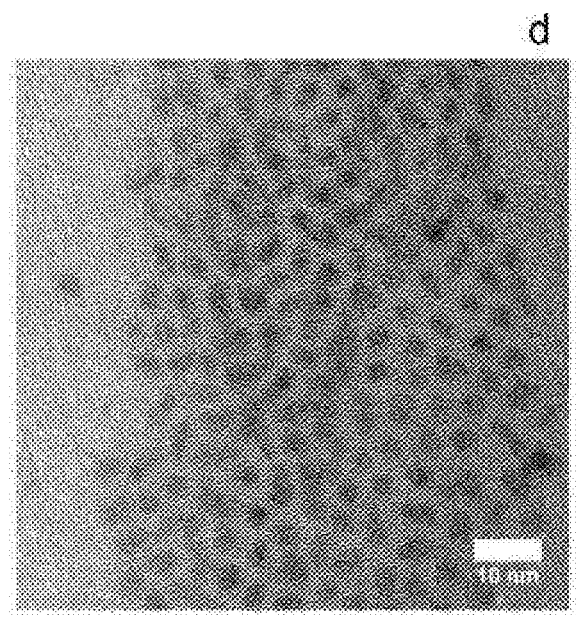

ZnSe particles were grown, using a similar synthesis method as described for the first example of this set of experiments. In brief, 0.4 mmole of ZnO were mixed with 1.2 mmole of oleic acid and 10 mL of squalene. The solution was heated up to 340° C. to form the zinc carboxylate. The use of the squalene is due to the high temperature needed to dissolve the ZnO. The temperature is higher than the boiling point of the ODE. The solution was cooled down to 270° C., then 1 mL of the heterogeneous ODE-Se (0.2 M) precursor was injected. Aliquots were taken at fixed times (7 s, 15 s, 30 s, 1 min, 2 min, 4 min, 8 min and 16 min). The reaction temperature is set to 260° C. Again, the absorption spectra of aliquots taken at different times after the reaction FIG. 14a indicate the formation of ZnSe NCs that grow larger with increasing reaction time (the arrow indicates increasing reaction time). The development of the wavelength of the first exciton transition as a function of time (14b) indicates that also in this case, $d_{NC}$ reaches a constant value within 8 minutes. The yield of the reaction is similar to the one achieved with the CdSe being about 85%. As shown by FIGS. 14c and d, XRD and TEM confirm the formation of zinc blende ZnSe nanocrystals with, in this case, an average diameter of 3.4 nm.

Example 3

Copper selenide $Cu_2Se$ nanoparticles were formed using copper acetylacetonate $Cu(AcAc)_2$ dissolved in oleyamine (OLA) as a coordinating solvent. This first mixture was heated up to 130° C. At this temperature a second mixture of OLA and selenium powder, the selenium powder being dispersed in the OLA, was injected in the first mixture, whereby the copper Cu and selenium Se were present in a 1:1 ratio. The blue copper acetylacetonate reacted immediately forming black copper selenide $Cu_2Se$ nanoparticles. After 15 minutes the reaction was quenched.

Example 4

$In_2Se_3$ nanoparticles were synthesized using oleylamine (OLA) as coordinating solvent. In a typical synthesis, indium chloride (1.0 mmol) was dissolved in 5 ml OLA and put under a nitrogen atmosphere. Upon reaching 200° C., selenium (1.5 mmol) was injected as a heterogeneous dispersion in 5 ml OLA. After the injection, the temperature was allowed to restore to the original value, resulting in a clear red solution, indicating the formation of $In_2Se_3$ nanoparticles. The reaction was stopped after 20 min. The same observations were made when indium chloride (1.0 mmol), selenium (1.5 mmol) were mixed in OLA and heated to 200° C. under a nitrogen atmosphere.

Example 5

1 mmol Cu(acac)2 (Cu-acetylacetonaat) and 1 mmol In(acac)3 were mixed in 7 ml of oleylamine and 3 ml 1-octadeceen. To prevent any oxidation the synthesis was performed under nitrogen.

As selenium precursor the heterogeneous Se dispersion was used. 2.1 mmol Se was dispersed in 4 ml of octadecene at room temperature. This mixture was injected in the previous described mixture at 240° C. The reaction was cooled down to room temperature after 1 hour. Purification was preformed as described above.

The particles resulted in CuInSe with a size of 15 nm. The particles were capped with oleylamine and could be dissolved in appolar solvents.

The invention claimed is:
1. A method for synthesis of nanoparticles of metal selenide, metal selenide alloys, metal chalcogenides comprising at least selenium or metal chalcogenide alloys comprising at least selenium, the method comprising:
obtaining a heterogeneous dispersion of powder of at least selenium in a first solvent at a first temperature, the first temperature being such that the heterogeneous dispersion comprises at least a fraction of undissolved powder in the solvent;
providing a metal cation precursor and introducing the heterogeneous dispersion into a second solvent, the second solvent being at a second temperature higher than said first temperature allowing, upon introduction of the heterogeneous dispersion, dissolution of at least the fraction of the powder resulting in nucleation of the nanoparticles.

2. A method according to claim 1, wherein said obtaining and/or said introducing is performed under atmospheric conditions.

3. A method according to claim 1, wherein the first and/or the second solvent is a non-coordinating solvent.

4. A method according to any of claim 1, wherein the first and/or the second solvent is a coordinating solvent.

5. A method according to claim 1, wherein the method further comprises selecting or tuning any or a combination of a concentration or ratio of concentrations of components in the dispersion and/or the second solvent used, the type of the first solvent and the type of the second solvent as function of a predetermined dimension of the nanoparticles to be obtained.

6. A method according to claim 1, wherein the method further comprises adding ligands with a selected or tuned chain length for obtaining a predetermined dimension of the nanoparticles.

7. A method according to claim 1, wherein introducing the heterogeneous dispersion into a second solvent comprises performing hot injection.

8. A method according to claim 1, wherein the method further comprises after said obtaining a heterogeneous dispersion and after said introducing into a second solvent, the step of forming a shell around the nanoparticles already formed.

9. A method according to claim 8, wherein the shell material comprises nanoparticles of metal selenium, metal selenide alloys, metal chalcogenide comprising at least selenium or metal chalcogenide alloys comprising at least selenium, and wherein forming the shell comprises
obtaining a second heterogeneous dispersion of powder of one or more of the group of selenium, sulfur or tellurium in a third solvent at a low temperature, the low temperature being such that the second heterogeneous dispersion comprises at least a fraction of undissolved powder in the further solvent, and
introducing the second heterogeneous dispersion into fourth solvent comprising the nanoparticles already formed and a metal cation precursor, the solvent being at a temperature allowing, upon introduction of the second heterogeneous dispersion, dissolution of the powder resulting in nucleation of shell formation around the core.

10. A method according to claim 1, the method further comprising quenching the reaction mixture after formation of the nanoparticles.

11. A method according to claim 1, wherein providing a metal cation precursor is performed by providing the metal cation precursor in the second solvent.

12. A method according to claim 1, wherein providing a metal cation precursor is performed by providing the metal cation precursor in the heterogeneous dispersion.

* * * * *